United States Patent
Zalluhoglu et al.

(10) Patent No.: US 12,428,948 B2
(45) Date of Patent: Sep. 30, 2025

(54) WELLBORE TRAJECTORY MODEL CALIBRATION FOR DIRECTIONAL DRILLING

(71) Applicant: Halliburton Energy Services, Inc., Houston, TX (US)

(72) Inventors: Umut Zalluhoglu, Humble, TX (US); Nazli Demirer, Houston, TX (US); Julien Christian Valery Marck, Houston, TX (US); Robert Darbe, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 452 days.

(21) Appl. No.: 16/398,716

(22) Filed: Apr. 30, 2019

(65) Prior Publication Data
US 2020/0095860 A1 Mar. 26, 2020

Related U.S. Application Data

(60) Provisional application No. 62/734,861, filed on Sep. 21, 2018.

(51) Int. Cl.
*E21B 47/022* (2012.01)
*E21B 7/04* (2006.01)
(Continued)

(52) U.S. Cl.
CPC ............. *E21B 47/022* (2013.01); *E21B 7/04* (2013.01); *E21B 44/00* (2013.01); *E21B 49/00* (2013.01); *E21B 2200/20* (2020.05); *G01V 20/00* (2024.01)

(58) Field of Classification Search
CPC .......... E21B 47/022; E21B 44/00; E21B 7/04; E21B 41/0092; E21B 49/00; E21B 2200/20; E21B 7/06; G01V 99/005
See application file for complete search history.

(56) References Cited

U.S. PATENT DOCUMENTS

| | | | |
|---|---|---|---|
| 5,419,405 | A | 5/1995 | Patton |
| 7,172,037 | B2 | 2/2007 | Dashevskiy et al. |

(Continued)

FOREIGN PATENT DOCUMENTS

| | | |
|---|---|---|
| EP | 0744526 A1 | 11/1996 |
| GB | 2367626 A | 10/2002 |

(Continued)

OTHER PUBLICATIONS

Downton, Geoff C., and M. Ignova. "Stability and response of closed loop directional drilling system using linear delay differential equations." 2011 IEEE International Conference on Control Applications (CCA). IEEE, 2011. (Year: 2011).*

(Continued)

*Primary Examiner* — Michael Edward Cocchi
(74) *Attorney, Agent, or Firm* — DeLizio, Peacock, Lewin & Guerra LLP

(57) ABSTRACT

One or more sensors are positioned downhole in a wellbore of a geological formation. One or more survey directional measurements associated with the wellbore are performed and one or more continuous directional measurements associated with the wellbore are performed. A wellbore trajectory model projects a trajectory of the wellbore to respective measured depths at which at least one of the one or more survey directional measurements and one or more continuous directional measurements were performed or obtained to predict one or more directional measurements of the wellbore at those depths. One or more differences are determined between the predicted one or more directional measurements and at least one of the one or more survey directional measurements and the one or more continuous directional measurements. The wellbore trajectory model is calibrated based on the one or more differences between predicted measurements and performed measurements.

20 Claims, 9 Drawing Sheets

(51) Int. Cl.
*E21B 44/00* (2006.01)
*G01V 20/00* (2024.01)
*E21B 49/00* (2006.01)

(56) References Cited

U.S. PATENT DOCUMENTS

| | | | |
|---|---|---|---|
| 7,814,989 B2 | 10/2010 | Nikolakis-Mouchas et al. | |
| 8,676,558 B2 | 3/2014 | Pirovolou | |
| 9,404,355 B2 | 8/2016 | Bayliss et al. | |
| 9,605,480 B2 | 3/2017 | Ignova et al. | |
| 9,784,089 B2 | 10/2017 | Boone et al. | |
| 2003/0121657 A1 | 7/2003 | Chia et al. | |
| 2009/0000823 A1* | 1/2009 | Pirovolou | E21B 7/04 175/61 |
| 2009/0120690 A1 | 5/2009 | Phillips | |
| 2010/0077623 A1* | 4/2010 | Imamura | E21B 47/022 33/304 |
| 2012/0013339 A1* | 1/2012 | Kuckes | E21B 47/0228 324/346 |
| 2012/0048618 A1* | 3/2012 | Zamanian | E21B 47/024 702/6 |
| 2012/0330551 A1* | 12/2012 | Mitchell | E21B 47/022 702/9 |
| 2013/0231787 A1* | 9/2013 | Chapman | E21B 44/00 700/282 |
| 2015/0211351 A1* | 7/2015 | Bayliss | E21B 7/06 700/275 |
| 2015/0218887 A1* | 8/2015 | Bayliss | E21B 44/005 175/24 |
| 2015/0247399 A1* | 9/2015 | Doelalikar | E21B 12/02 175/48 |
| 2015/0369031 A1 | 12/2015 | Yang et al. | |
| 2016/0341027 A1 | 11/2016 | Kyllingstad | |
| 2017/0058656 A1 | 3/2017 | Benson et al. | |
| 2017/0370151 A1* | 12/2017 | Banirazi-Motlagh | G05B 15/02 |

FOREIGN PATENT DOCUMENTS

| | | |
|---|---|---|
| WO | 2015195497 A1 | 12/2015 |
| WO | 2016108897 | 7/2016 |
| WO | 2019132929 A1 | 7/2019 |
| WO | 2020060589 A1 | 3/2020 |

OTHER PUBLICATIONS

ElGizawy, Mahmoud Lotfy. Continuous measurement-while-drilling surveying system utilizing MEMS inertial sensors. Diss. University of Calgary, Department of Geomatics Engineering, 2009. (Year: 2009).*
Kremers, Niek Antonius Henricus, Emmanuel Detournay, and Nathan Van De Wouw. "Model-based robust control of directional drilling systems." IEEE Transactions on Control Systems Technology 24.1 (2015): 226-239. (Year: 2015).*
PCT Application Serial No. PCT/US2019/029867, International Search Report, mailed Aug. 16, 2019, 4 pages.
PCT Application Serial No. PCT/US2019/029867, International Written Opinion, mailed Aug. 16, 2019, 6 pages.
Farah, "Directional Well Design, Trajectory and Survey Calculations, With a Case Study in Fiale, Asal Rift, Djibouti", Geothermal Training Programme, United Nations University, Reports 2013 No. 27, pp. 625-658.
GB Application Serial No. GB 1910927.1; Combined Search and Exam Report under Sections 17 and 18(3); mailed Jan. 17, 2020, 6 pages.
"CA Application No. 3,051,279 Office Action", Sep. 20, 2022, 16 pages.

* cited by examiner

WELLBORE TRAJECTORY MODEL CALIBRATION FOR DIRECTIONAL DRILLING

RELATED DISCLOSURE

This disclosure claims the benefit of priority under 35 U.S.C. § 119(e) of U.S. Provisional Application No. 62/734,861 filed Sep. 21, 2018 entitled "Multi-Level Learning Scheme for Calibrating a Wellbore Trajectory Model for Directional Drilling", the contents of which are herein incorporated by reference in its entirety.

FIELD OF USE

The disclosure generally relates to methods for directionally drilling wells, particularly wells for production of hydrocarbon products, and more particularly to calibrating a wellbore trajectory model that indicates a trajectory of a wellbore being directionally drilled.

BACKGROUND

Drilling for hydrocarbons, such as oil and gas, typically involves steering a drilling tool at underground depths that reach thousands of feet below the surface to reach a set target in a geologic formation such as an oil or gas reservoir. The drilling tool is steered to the set target based on steering inputs such as a toolface and steering ratio. To facilitate reaching the set target, a wellbore trajectory model is used to predict a trajectory of a wellbore. Proposed steering inputs are input into the wellbore trajectory model which outputs the predicted trajectory of the wellbore. If predicted trajectory indicates that the set target will be reached, then the drilling tool is actually steered to the set target based on the proposed steering inputs. If predicted trajectory does not indicate that the set target will be reached, then the proposed steering inputs are adjusted until the wellbore trajectory model indicates that the set target will be reached. Then, the drilling tool is actually steered to the set target based on the adjusted steering inputs. In this regard, reaching the set target in the geologic formation depends on an accuracy of the well trajectory model to predict the wellbore trajectory being drilled in the geologic formation.

BRIEF DESCRIPTION OF THE DRAWINGS

Aspects of the disclosure may be better understood by referencing the accompanying drawings.

Figure 1:
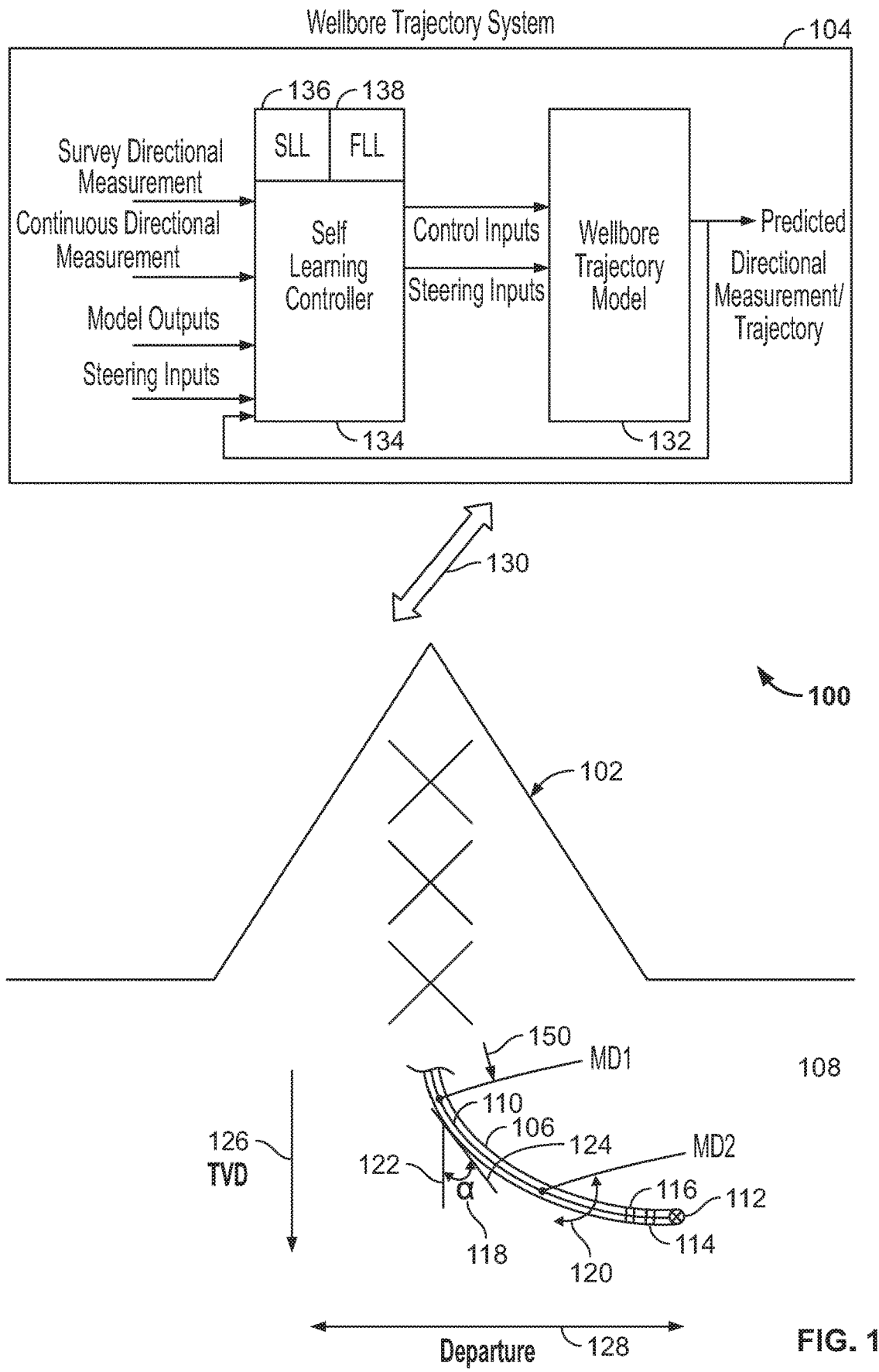
FIG. 1 is a block diagram of a system for calibrating a wellbore trajectory model for use in directionally drilling a wellbore in a geologic formation.

The drawings are for purpose of illustrating example embodiments, but it is understood that the inventions are not limited to the arrangements and instrumentalities shown in the drawings.

DESCRIPTION

The description that follows includes example systems, methods, techniques, and program flows that embody aspects/embodiments of the disclosure. However, it is understood that this disclosure may be practiced without these specific details. For instance, this disclosure refers to calibration of wellbore trajectory models for use in directionally drilling a wellbore in a geologic formation in illustrative examples. In other instances, well-known instruction instances, protocols, structures and techniques have not been shown in detail in order not to obfuscate the description.

Overview

Embodiments described herein are directed to calibration of a wellbore trajectory model which predicts the wellbore trajectory of a wellbore being drilled either onshore or offshore. The calibration is based on taking survey directional measurement and/or continuous directional measurement of a wellbore that being drilled. The continuous directional measurements are taken more frequently than the survey directional measurement (e.g., surveys can be taken every 30, 45 or 90 feet, while continuous directional measurements taken via intelligent drilling tools can be obtained as fast as every 0.5 feet or less), but survey directional measurements are typically more accurate than continuous directional measurements. A reason for the increased accuracy is that the survey directional measurement is taken when a sensor is stopped while the continuous directional measurement is taken when the sensor is moving.

The calibration may include a: (i) slow-learning loop (SLL) and (ii) fast-learning loop (FLL). SLL involves determining an error (e.g., difference) between the survey directional measurements and directional measurements predicted by the wellbore trajectory model to determine a slow control input to calibrate the wellbore trajectory model. FLL involves determining an error (e.g., difference) between the continuous directional measurements and directional measurements predicted by the wellbore trajectory model to determine a fast control input to calibrate the wellbore trajectory model. The slow control input captures the long-term external effects on wellbore trajectory (formation tendencies, wear on tool components) and the fast control input captures the short-term and instantaneous effects (rock interface changes, faults) on the wellbore trajectory. The fast and slow control inputs are combined together and input into the wellbore trajectory model as a calibration. Further, steering inputs are also input into the wellbore trajectory model. Based on the fast control inputs, slow control inputs, and steering inputs, the wellbore trajectory model predicts the wellbore trajectory of a wellbore that would be drilled. Further, the wellbore trajectory model continues to be calibrated in real time as additional directional measurements are received so that the wellbore trajectory continues to be accurately predicted as the wellbore is drilled.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Illustrations

FIG. 1 is a block diagram 100 of a system for calibrating a wellbore trajectory model to accurately predict a trajectory of a wellbore being drilled in a geologic formation. The block diagram 100 includes drilling apparatus 102, a wellbore trajectory system 104, and the geologic formation 108 in which the wellbore 106 is being drilled.

The drilling system 102 facilitates drilling the wellbore 106 with a given trajectory in the geologic formation 108. The drilling system 102 includes a drill string 110 and drill bit 112 attached to the drill string 110 for drilling the wellbore 106 having the given trajectory. The drilling system 102 may include downhole devices 114 such as a mud motor and/or a rotary steerable system (RSS) to facilitate this drilling. With RSS, the drill string 110 is rotated from the surface which causes the drill bit 112 to rotate to drill the geologic formation 108. With the mud motor, the drill bit 112 is rotated by the mud motor to drill the geologic formation 108 and the drill string 110 is either held rotationally stationary (slide mode) or not (rotation mode). The mud motor uses drilling fluid (commonly referred to as drilling mud, or just mud) to create an eccentric motion in a power section of the motor which is transferred as concentric power to the drill bit 112.

Steering the drill bit 112 is accomplished based on a steering input. A steering input may include a toolface (TF) and steering ratio (SR). The toolface is an angle measured in a plane perpendicular to the drill string axis between a reference on the drill string 110 and a reference such as magnetic north or gravity in which the drill bit 112 is to face. The toolface indicates a direction of drilling. The steering ratio is typically a value between zero and one which indicates how quickly or slowly a drilling direction is changed as a function of distance based on the steering input. The steering ratio and/or toolface may be controlled by adjusting certain drilling parameters, for example, a rotary speed of the drill string 110, flow of drilling fluid (i.e., mud), and/or weight on bit (WOB). One or more sensors 116 may be attached to the drill string 110. The position of the sensors 116 along the drill string 110 is exemplary in nature, and can be located at different positions or multiple positions as well. The one or more sensors 116 may take the form of measuring while drilling (MWD) tools or logging while drilling (LWD) tools which facilitate performing directional measurements along the wellbore 106, including one or more of determining curvature of the wellbore 106, attitude of the wellbore 106, and/or spatial position of the wellbore 106 using one or more of electromagnetic, nuclear, acoustic, and mechanical techniques. Other types of measurements may be taken as well.

Attitude indicates an orientation of the wellbore 106 and could be characterized as an inclination 118 and/or azimuth 120. The inclination 118 may be an angle α between a direction of gravity 122 and a tangent 124 to the wellbore 106. Inclination 118 may be measured with respect to other references as well. The azimuth 120 may be a direction of the wellbore 106 such as compass north, south, east, west. Spatial position (or generally position) indicates a one, two, or three-dimensional position of the wellbore on the Earth. In three-dimensions, the position can be in Cartesian coordinates including a true vertical depth (TVD) 126 or a departure 128 such as north/south departure (NS), east/west departure (EW). The directional measurements may take other forms as well. Curvature indicates change of inclination (and/or azimuth) for a change in measured depth. The measured depth (MD) is a length of the wellbore 106 measured along the actual well path shown as 150. For example, the measured depth at a position along the wellbore 106 is estimated by a drill string length which is known. Curvature in inclination plane (known as build rate) could be written in units of deg/ft among other units. With two inclination measurements taken at measured depth1 (shown as MD1 in the wellbore 106) and measured depth2 (shown as MD2 in the wellbore 106), curvature in this plane would be (Inc2−Inc1)/(measured depth2−measured depth1), where Inc1 and Inc2 are the inclination at MD1 and MD2. The directional measurements may take other forms as well.

The directional measurements may take the form of survey directional measurements where drilling is stopped to perform the directional measurements at various positions along the wellbore 106 and/or continuous directional measurements where directional measurements are performed while drilling. By stopping the drilling, the survey directional measurements may be more accurate than the continuous directional measurements. The continuous directional measurements may be noisy because the drill string 110 and/or drill bit 112 is moving/rotating during the measurement. Further, the survey directional measurements are taken less frequently (e.g., every 30, 45, or 90 feet) than continuous directional measurements taken as fast as every 0.5 feet or less.

In one or more examples, a well survey instrument such as a sonde (not shown) with one or more sensors may be lowered into the wellbore 106 via a conveyance such as a wireline including but not limited to a wireline slickline, coiled tubing, piping, downhole tractor, or a combination thereof. The well instrument may be used to determine the directional measurements instead of or in addition to using the sensors 116 on the drill string 110. In this regard, the directional measurements described herein are not limited to a mechanism by which the directional measurements are performed at the various positions in the wellbore 106.

The directional measurements may be communicated to the wellbore trajectory system 104 via a communication link 130 such as a wired or wireless connection that implements one or more of various known telemetry techniques such as mud-pulse, acoustic, electromagnetic, etc. The wellbore trajectory system 104 includes a wellbore trajectory model 132 and a self-learning controller 134. The wellbore trajectory model 132 may predict a trajectory of the wellbore 106 as it is being drilled in the geologic formation 108. The self-learning controller 134 may calibrate the wellbore trajectory model 132 for conditions downhole so as to improve prediction of the wellbore trajectory in the geologic formation 108.

The self-learning controller 134 receives one or more inputs to calibrate the wellbore trajectory model 132. The one or more inputs includes one or more of steering inputs, survey directional measurements, continuous directional measurements, and a model output. The steering inputs may be a steering direction of the drill bit 112 such as toolface and steering ratio. The survey directional measurements and continuous directional measurements may be directional measurements of the wellbore 106 taken via the one or more sensors 116 and/or the sonde. The model output may be a predicted directional measurement of the wellbore 106 at a measured distance along the wellbore 106, e.g., determined by the wellbore trajectory model 132. The self-learning controller 134 provides a control input to the wellbore trajectory model 132. The control input accounts for external, unmodeled, and/or unpredictable effects associated with steering the drill bit 112. The wellbore trajectory model 132 is calibrated based on the control input so that the wellbore trajectory model 132 accurately predicts a trajectory of the wellbore 106 in the geologic formation 108 based on the steering input. The trajectory may identify one or more directional measurements associated with a wellbore that would be drilled based on the steering input. The trajectory may be used by the drilling system 102 to further steer the drill bit 112 to reach a target in the geological formation 108.

The wellbore trajectory model 132 may take many forms. In one example, the wellbore trajectory model 132 may be a mathematical model which predicts a wellbore trajectory drilled in the geologic formation in terms of absolute directional measurements along the wellbore 106. In another example, the wellbore trajectory model 132 may be a probabilistic model which predicts a wellbore trajectory drilled in the geologic formation in terms of probable directional measurements along the wellbore 106. Outputs of the probabilistic model would be a mean outcome of the directional measurements along the wellbore and a standard deviation (or variance). The probabilistic model can be based on previously drilled wells in a same area/basin, across different areas/basins, or for a given set of tools, bit, etc. Properties associated with the previously drilled wells may be used to calibrate mean and variance output by the probabilistic model. The wellbore trajectory model 132 may take other forms including neural networks and fuzzy systems.

The self-learning controller 134 may have a slow-learning loop (SLL) 136 and fast-learning loop (FLL) 138. The SLL 136 uses the survey directional measurements of the geological formation 108 and wellbore trajectory model 132 to determine a slow control input. The SLL 136 captures the long-term external effects on wellbore trajectory (e.g., wear on drill components). The FLL 138 uses the continuous directional measurements of the geologic formation 108 during drilling and wellbore trajectory model 132 to determine a fast control input. The FLL 138 captures the short-term and instantaneous effects (e.g., formation faults) on wellbore trajectory. The self-learning controller 134 combines the slow control input and fast control input to form the control input which is provided to the wellbore trajectory model 132 for calibrating the wellbore trajectory model 132. Further, steering inputs are also input into the wellbore trajectory model. Based on the fast control inputs, slow control inputs, and steering inputs, the wellbore trajectory model 132 predicts the wellbore trajectory of the wellbore 106 that is being drilled.

The SLL 136 provides a more reliable calibration to the wellbore trajectory model 132 compared to the FLL 138. However, SLL 136 does not provide a sufficiently quick calibration for the wellbore trajectory model 132, for instance when an unexpected formation change happens since the survey directional measurements are updated less frequently than continuous directional measurements. For such scenarios, FLL 138 provides the quick calibration, but the fast control input may be noisy due to the continuous directional measurements being noisy. To prevent reaction to noise in the calibration process, the calibration effect coming from the FLL 138 may be weighted less than the calibration effect coming from the SLL 136 in the control input.

Figure 2:
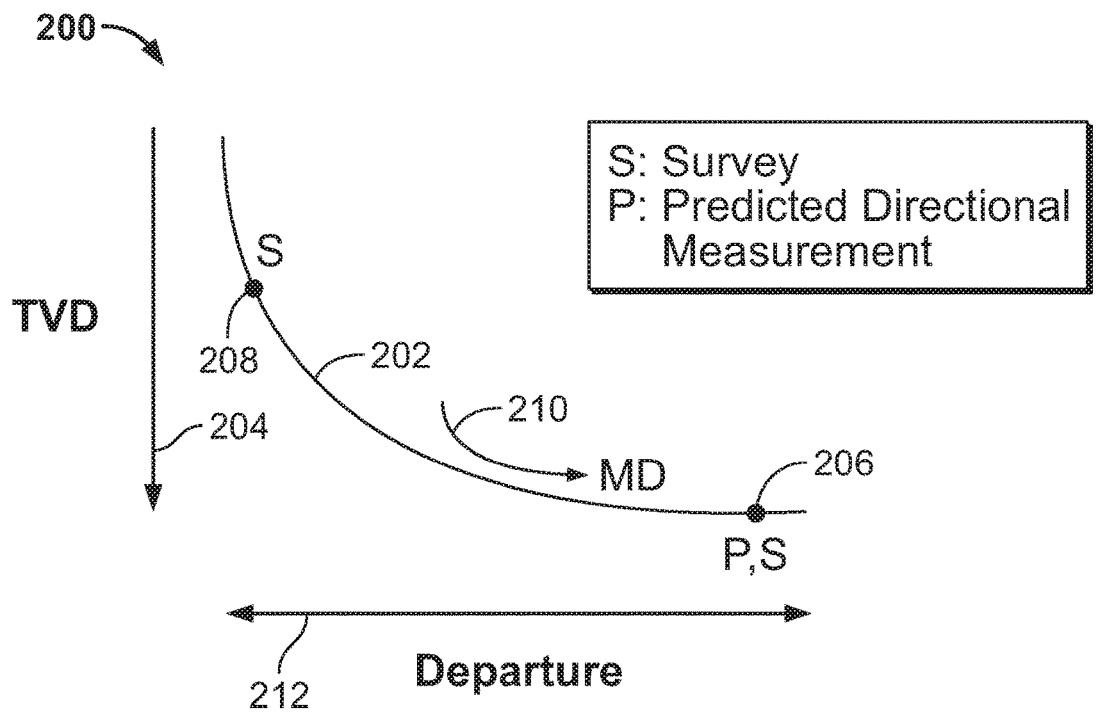
FIG. 2 illustrates example survey directional measurements associating with determining a slow control input for calibration.

FIG. 2 illustrates example survey directional measurements 200 associated with determining the slow control input. A current survey and past survey are performed in an example wellbore 202. For example, survey directional measurements 200 are taken every 30, 45, or 90 feet. A trajectory of the example wellbore 202 is shown as a function of true vertical depth (TVD) 204 in the geologic formation, measured depth (MD) 210 along the wellbore 202, and departure 212 such as north/south or east/west departure. The past survey is performed at a first measured depth 208 in the wellbore 202 and the current survey is performed at a second measured depth 206 in the wellbore 202. The second measured depth 206 might be a position further downhole in the wellbore 202 and the first measured depth 208 may be uphole. A S symbol is used to represent a survey that is performed at a measured depth and survey directional measurements are associated with each survey. A P symbol is used to represent a directional measurement predicted by the wellbore trajectory model at the second measured depth 206. In one or more examples, there may be an error between the predicted directional measurement and the survey directional measurement associated with the current survey. The error may be a difference between the predicted directional measurement and the survey directional measurement associated with the current survey. This error is used to determine the slow control input used to calibrate the wellbore trajectory model for long-term external effects on wellbore trajectory.

Figure 3:
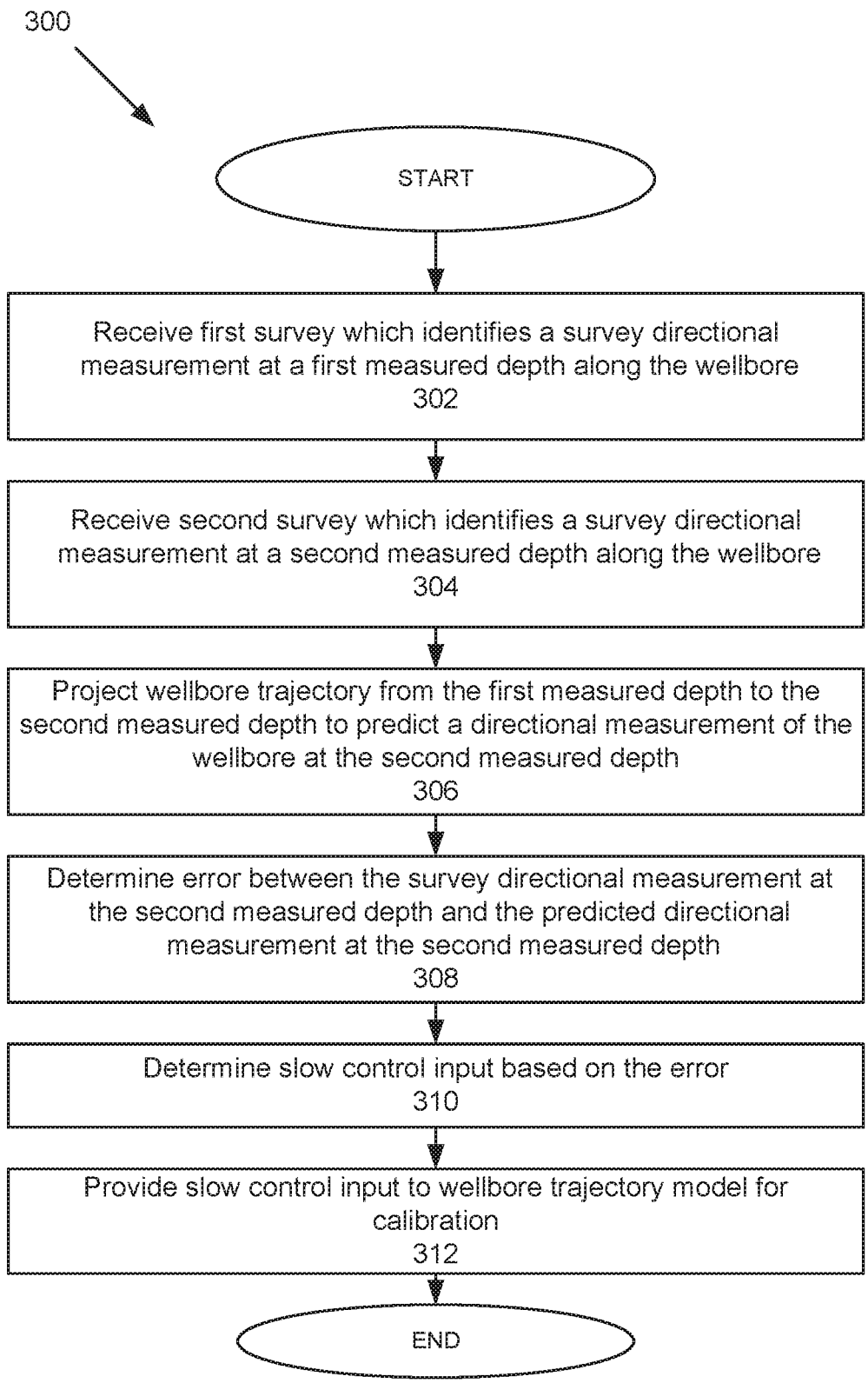
FIG. 3 is a flow chart of functions associated with determining the slow control input.

FIG. 3 is a flow chart 300 of functions associated with determining the slow control input into the wellbore trajectory model based on the measurements shown in FIG. 2. The SLL functions may be performed by the self-learning controller.

At 302, a first survey is received which identifies a survey directional measurement at a first measured depth along the wellbore. At 304, a second survey is received which identifies a survey directional measurement at a second measured depth along the wellbore. The second measured depth is further downhole compared to the first measured depth. At 306, a wellbore trajectory is projected downhole from the first measured depth to the second measured depth to predict a directional measurement of the wellbore at the second measured depth. The wellbore trajectory may be projected from the first measured depth to the second measured depth based on the wellbore trajectory model which takes as input steering ratio (SR) and/or toolface (TF) of the drilling system between the first measured depth and second measured depth. At 308, an error is determined between the survey directional measurements at the second measured depth and the predicted directional measurements at the second measured depth. At 310, a slow control input is determined as a function of this error and steering ratio and/or toolface along a distance that the trajectory model was run. At 312, the slow control input is provided to the wellbore trajectory model for calibration. The control input determined by the SLL is used to calibrate the wellbore trajectory model so that the curvature, attitude, and/or position error calculated by a difference between the model-predicted wellbore trajectory and actual wellbore trajectory based on the SLL is minimized. This way the wellbore trajectory model may more accurately predict, as the wellbore continues to be drilled, directional measurements associated with the wellbore. Further, the slow control input may be updated as each survey is conducted.

Figure 4:
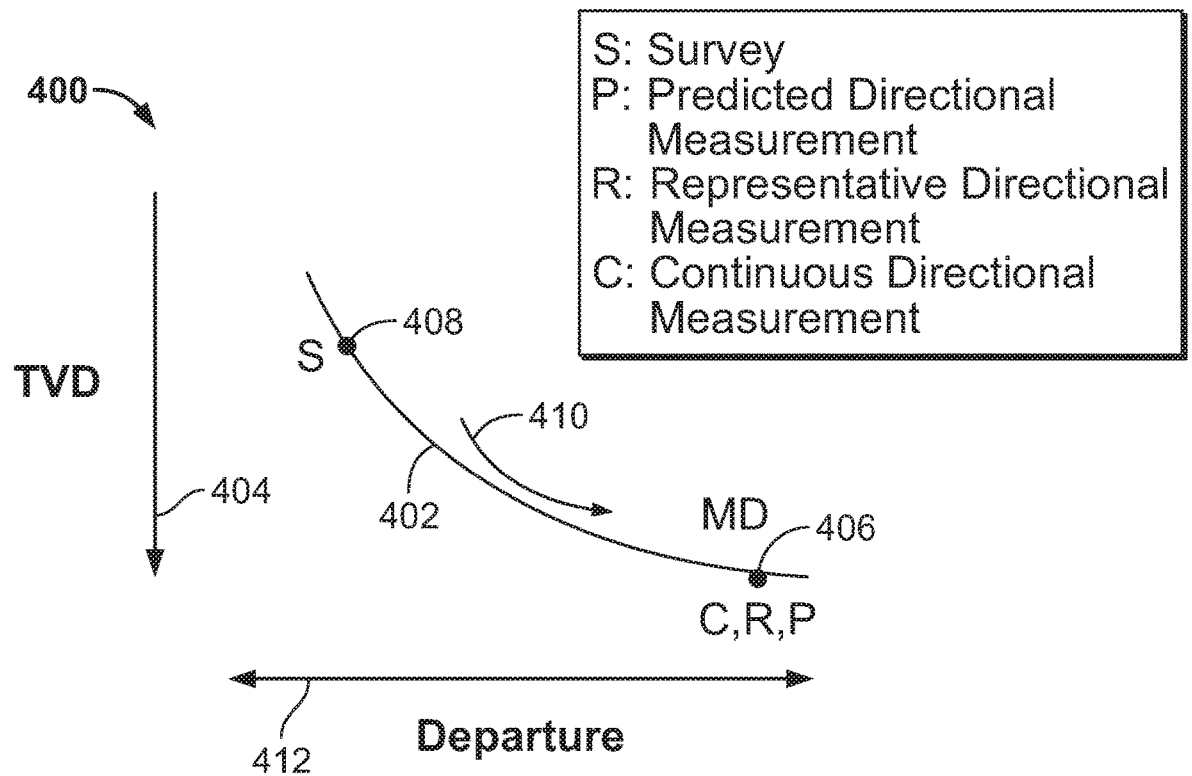
FIG. 4 illustrates example survey and continuous directional measurements associated with determining a fast control input for calibration.

FIG. 4 illustrates example survey and continuous directional measurements 400 associated with determining the fast control input. A current survey and continuous directional measurement is performed in an example wellbore 402. For example, continuous directional measurements are taken every 10 feet from the current survey. The trajectory of the example wellbore 402 is shown as a function of true vertical depth (TVD) 404, measured depth (MD) 410, and departure 412 such as north/south or east/west departure. A first survey is performed at a first measured depth 408 along the wellbore 402. The survey is represented by an S symbol. Survey directional measurements are associated with the survey. Continuous directional measurements are also performed by the sensors of the drill string at a second measured depth 406 further downhole in the wellbore 402 as the wellbore 402 is drilled. The continuous directional measurements are represented by an C symbol and, in one or more examples, is an attitude measurement. The directional measurements associated with the continuous directional measurements may be adjusted by the directional measurements associated with the survey to generate a representative directional measurement shown by an R symbol at the second measured depth 406. A directional measurement of the wellbore predicted by the wellbore trajectory model at the second measured depth 406 along the wellbore 402 is also determined. The predicted directional measurement is represented by a P symbol. In one or more examples, there may be an error between the predicted directional measurement and the representative directional measurements. This error is used to determine the fast control input used to calibrate the wellbore trajectory model for short-term external effects on wellbore trajectory.

Figure 5:
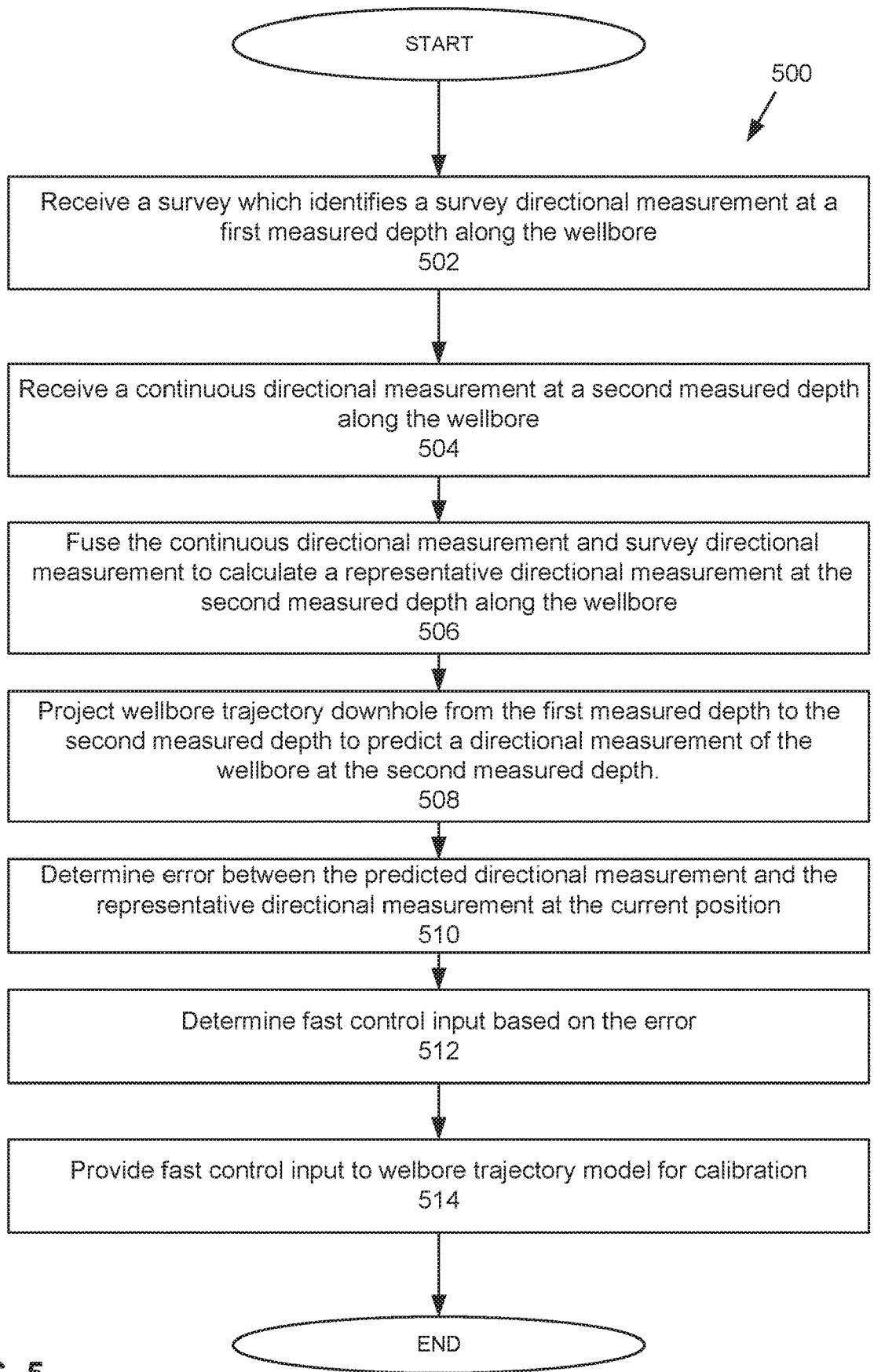
FIG. 5 is a flow chart of functions associated with determining the fast control input.

FIG. 5 is a flow chart 500 of functions associated with determining the fast control input based on the measurements shown in FIG. 4. The FLL functions may be performed by the self-learning controller to determine the fast control input.

At 502, a survey is received which identifies a survey directional measurement at a first measured depth along the wellbore. At 504, a continuous directional measurement is received at a second measured depth along the wellbore. The second measured depth may be downhole from the first measured depth. At 506, the continuous directional measurement and the survey directional measurement are fused to calculate a representative directional measurement at the second measured depth along the wellbore. The fusion may involve combining the survey directional measurement and the continuous directional measurement to determine the representative directional measurement. For example, the survey directional measurement may be weighted less than the continuous directional measurement as a distance between the two directional measurements increases and combined together to form the representative directional measurement. In some examples, the continuous directional measurement is not fused and the representative directional measurement may be the same as the continuous directional measurement. At 508, a wellbore trajectory is projected downhole from the first measured depth to the second measured depth to predict a directional measurement at the second measured depth. The wellbore trajectory may be projected based on the wellbore trajectory model which takes as input steering ratio (SR) and/or toolface (TF) of the drilling system between the first measured depth and the second measured depth. At 510, the error is determined between the predicted directional measurement and the representative directional measurement at the second measured depth. At 512, a fast control input is determined based on this error, steering ratio and/or toolface along the distance the wellbore trajectory model was run. At 514, the fast control input is provided to the wellbore trajectory model for calibration. The fast control input determined by the FLL is used to calibrate the wellbore trajectory model so that the curvature, attitude, and/or position error calculated by a difference between the model-predicted wellbore trajectory and actual wellbore trajectory based on the FLL is reduced. This way the wellbore trajectory model may more accurately predict, as the wellbore is continued to be drilled, directional measurements associated with the wellbore.

A fast control input may be updated theoretically as fast as the continuous measurement updates; however, in practice there may be no need for such high update rate. In that case, the FLL can be run at a slower speed than the continuous measurement updates. In one or more examples, the fast control input may be based on additional input(s) that indicate the properties of the drilled rock, such as anisotropy, local principal stresses, and unconfined/confined compressive strength of the rock (e.g., how hard or soft a rock is to drill through), gamma-ray measurements, resistivity, etc. In one or more examples, the fast control input may be based on additional input(s) that indicate drilling parameters, such as WOB, torque on bit, mud flow rate, or RPM obtained from surface measurements, downhole measurements, or estimated from the wellbore trajectory model. The additional inputs can also be used to adjust fast control inputs from offset wells near the wellbore being drilled rather than having to run the FLL for the wellbore being drilled.

In some examples, the SLL and FLL can use a multiplicity of historical (past) continuous directional measurements and/or survey directional measurements along with the most recent ones to determine the control input. In other examples, either the FLL and SLL can be used as a stand-alone calibration methodology in case continuous directional measurements and/or survey directional measurements are not available or unreliable.

Figure 6:
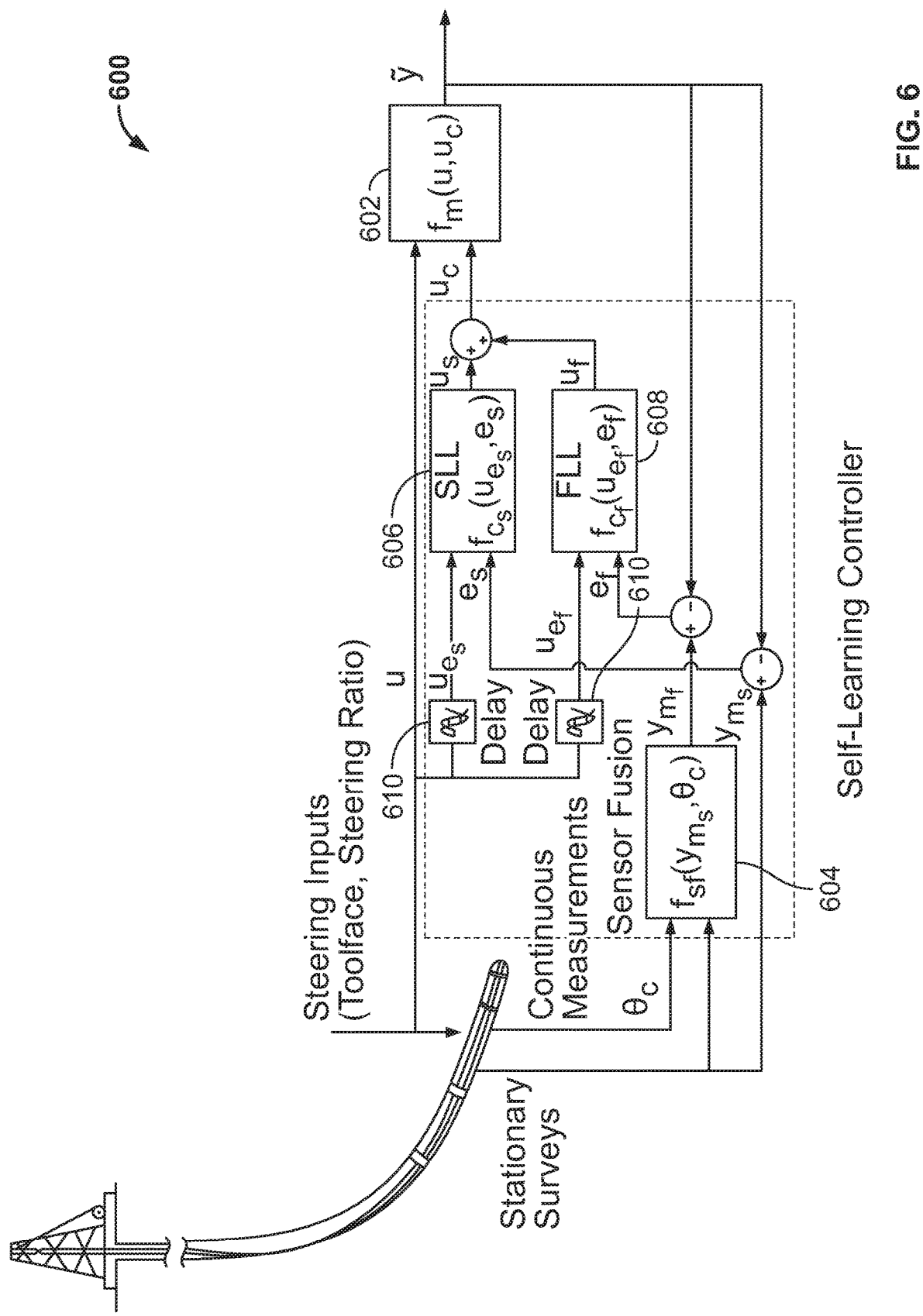
FIG. 6 is a block diagram of a self-learning controller which provides a control input (e.g., fast and/or slow control input) to the wellbore trajectory model.

FIG. 6 is a block diagram 600 of the self-learning controller which provides the control input to the wellbore trajectory model 602. The block diagram 600 shows the wellbore trajectory model 602, sensor fusion logic 604, and control laws 606, 608 for SLL and FLL.

The wellbore trajectory model 602 is shown as, $(u, u_c)$, which is a function of the steering inputs u and the control input $u_c$. The steering input may be one or more of a steering ratio and toolface. The $u_c$ may be associated with the control inputs generated by the SLL and FLL. The output of the wellbore trajectory model 602 indicates the wellbore trajectory, y, in terms of, for example, curvature, attitude and/or position along the wellbore. In one or more examples, y may be a vector of curvature, attitude and/or position along the wellbore.

The sensor fusion logic 604 is shown as $f(y_{ms}, \Theta_c)$ which calculates a curvature, attitude and/or position at a measured depth, $y_{mf}$, as a function of curvature, attitude and/or position of a survey, $y_{ms}$, and a continuous attitude measurement $\Theta c$. The sensor fusion logic 604 estimates the directional measurement of the wellbore as the survey directional measurement modified by the continuous directional measurement. In one or more examples, $y_{mf}$ and $y_{ms}$ may be a vector including curvature, attitude and/or position. As the continuous directional measurement is noisy, the sensor fusion 604 may consist of one or more of the following in order to denoise and smoothen the continuous directional measurements: Finite Impulse Response (FIR) filter, Infinite Impulse Response (IIR) filter, Gaussian Process Regression (GPR) model. In some examples, there can be more than one continuous measurement that is fed to the sensor fusion 604 alongside the survey directional measurements. Noise in the measurements can be estimated/computed to improve the sensor fusion. Additionally, an offset can also be calculated/estimated in the continuous directional measurement improve the sensor fusion. For example, a continuous inclination measurement that has a constant bias from the survey inclination measurements due to sensor calibration issues and is +/−1 deg off from surveys is an offset which can be accounted for in the sensor fusion.

The SLL control law 606 is shown as $f_c(u_{es}, e_s)$ which calculates the slow control input for SLL, $u_s$, based on the inputs $e_s$ and $u_{es}$, which are the error between the directional measurement determined by a survey at a first measured depth along the wellbore and the directional measurement determined by a survey at a second measured depth along the wellbore, and the steering input along a distance between the first measured depth and second measured depth. $u_{es}$ is a historical (spatially delayed) control inputs where delay 610 correspond to the distances between the bit and the sensor locations on the drill string. In one or more examples, $e_s$ may be a vector of errors corresponding to each directional measurement and $u_{es}$ may be a vector of steering input over a distance of the wellbore. In one or more examples, values in each vector may be averaged and the respective average is used as input into the SLL control law.

The FLL control law 608 is shown as $f_c(u_{ef}, e_f)$ which calculates the control input for FLL, $u_f$, based on the inputs $e_f$ and $u_{ef}$, which are the error between the directional measurement predicted by the wellbore trajectory model at a first measured depth along the wellbore and the representative directional measurement at a second measured depth along the wellbore, and the steering input along a distance between the first and second measured depth. $u_{ef}$ is a historical (spatially delayed) control input where delay 610 correspond to the distances between the bit and the sensor locations on the drill string. In one or more examples, $e_f$ may be a vector of errors calculated at different measured depths along the wellbore and $u_{ef}$ may be a vector of steering inputs over this distance along the wellbore. In one or more examples, values in each vector may be averaged and the respective average is used as input into the FLL control law. The slow control input may update less frequently than the fast control input. For example, the slow control input may update when a survey is taken while the fast control input may update for each continuous directional measurement. In this regard, the control input into the wellbore trajectory model $u_c$ may be sum (or weighted sum) of a same slow control input with changing fast control input.

The control input, $u_c$, is the superposition of the individual control inputs from SLL and FLL. The control input may facilitate calibrating multiple terms of the wellbore trajectory model. At least one term can target calibrating the model parameters, while at least one other parameter can target compensating for biases that are not modeled such as formation tendencies, anisotropy, faults, pad, bit, bearing wear etc. which are valuable for geosteering and evaluating whether a given target can be successfully reached or for estimating an ability of the drilling system to follow a well plan. The calibration may involve weighting the multiple terms by a weighting function. The following two examples provide additional details of the calibration.

Example 1

Consider that a two-dimensional wellbore trajectory model only captures curvature, where the drilling tool's maximum curvature generation capability is represented by $\kappa_{Max}$:

$$y=(u,u_c)=\kappa_{Max}u+g(u,u_c)$$

Here, $u=SR\cos(TF)$, where SR ($0 \leq SR \leq 1$) represents a steering ratio and TF represents toolface, respectively. The steering ratio (SR) and toolface (TF) may be single value over a distance the wellbore trajectory model is run. Alternatively, one or more of the steering ratio SR and toolface TF may be a vector of steering ratios and toolfaces over a distance the wellbore trajectory model is run. The steering ratios and toolfaces may be used to calculate a vector of steering inputs. If a vector, the steering inputs in the vector may be averaged together to form an averaged steering input over the distance the wellbore trajectory model is run. ($u_c$) is a nonlinear calibration logic. Logic for SLL and FLL can be chosen as an array of two elements (weights) one proportional to u over the distance the error was calculated and one proportional to 1−u:

$$u_s=k_s e_s[u_{es} 1-u_{es}]$$

$$u_f=k_f e_f[u_{ef} 1-u_{ef}]$$

Here, $k_s$ and $k_f$ are constant gains which could be considered as proportional gains for SLL and FLL. Then, $u_s$ and $u_f$ are combined to determine $u_c$. In one example, of may be weighted equally such as $u_c = u_s + u_f$. In another example, the constant gains $k_s$ and $k_f$ may be applied to $u_s$ and $u_f$ respectively such that $u_s$ is weighted more than $u_f$ because $u_s$ is based on more accurate survey directional measurements compared to $u_f$ which is based on continuous directional measurements. Given $u_c = u_s + u_f$, the nonlinear calibration logic, $g(u, u_c)$, can be picked as $$(u,u_c)=u_c[u1]^T=\kappa_{Main} u \pm \kappa_{Bias}$$

where $$\kappa_{Main}=k_s e_s u_{es}+k_f e_f u_{ef}, \kappa_{Bias}=k_s e_s(1-u_{es})+k_f e_f(1-u_{ef})$$

The calibration is performed via two parameters $\kappa_{Main}$ and $\kappa_{Bias}$. Having two elements $[u_{es}\ 1-u_{es}-]$ or $[u_{ef} 1-u_{ef}-]$ helps to adjust $\kappa_{Main}$ if the steering input is high $0 \ll u \ll = 1$ more than $\kappa_{Bias}$. Similarly, if the steering input u is small $0 <= u \ll 1$ $\kappa_{Bias}$ is adjusted more than $\kappa_{Main}$. Intuitively, if there is no steering input, steering results will be driven by the bias, whereas if steering input is max (u=1), then the steering results will be dominated by the steering capability of the tool $\kappa_{Max}+\kappa_{Main}$. The calibrated model becomes $$y=(u,u_c)=(\kappa_{Max}+\kappa_{Main})u+\kappa_{Bias}$$

where $\kappa_{Main}$ is a control term which calibrates the model parameter $\kappa_{Max}$ and $\kappa_{Bias}$ is a bias term which compensates for the un-modeled effects on steering. The logic associated with the SLL and FLL, $f_{cs}$ and $f_{cf}$, is selected to distribute the error between control term $\kappa_{Main}$ and bias term $\kappa_{Bias}$ as a function of the steering ratio and toolface. Further, if the wellbore trajectory model is a probabilistic model, then $\kappa_{Main}$ and $\kappa_{Bias}$ may have a mean and variance that varies based on well properties. In one or more examples, properties of the drilled rock, such as unconfined/compressive strength of the rock (e.g., how hard or soft a rock is to drill through), gamma-ray measurements, resistivity, etc. can also be used to adjust the control term and/or bias term for the wellbore trajectory model associated with an offset well near the wellbore being drilled. The adjusted terms can be used in the wellbore trajectory model rather than having to run the calibration process for the wellbore being drilled.

Example 2

In this example, the trajectory model, control laws for SLL and FLL, and the sensor fusion logic are selected as in Table 1.

TABLE 1 functional relation, dynamics, details, and array size:

| Function | Functional Relation/ Dynamics | Details | Array size |
|---|---|---|---|
| $f_m(u, u_c)$ | $\frac{d\hat{y}}{d\xi} = A\hat{y} + Bu + g(u, u_c)$ | $\hat{y} = [\kappa\ \Theta]^T$ $u = SR\cos(TF)$ $g(u, u_c) = Cu_c[u\ 1]^T$ | $y \in R^{2\times1}, u \in R^{1\times1}$ $A \in R^{2\times2}, B \in R^{2\times1}$ $C \in R^{2\times2}$ |
| $f_{e_s}(u_{e_s}, e_s)$ | $u_s = K_s e_s[u_{e_s}(1 - u_{e_s})]$ | $e_s = y_{m_s} - \hat{y}$ | $e_s \in R^{2\times1}, K_s \in R^{1\times1}$ $u_s \in R^{2\times2}, u_{e_s} \in R^{1\times1}$ |
| $f_{e_f}(u_{e_f}, e_f)$ | $u_f = K_f e_f[u_{e_f}(1 - u_{e_f})]$ | $e_f = y_{m_f} - \hat{y}$ | $e_f \in R^{2\times1}, K_f \in R^{1\times1}$ $u_f \in R^{2\times2}, u_{e_f} \in R^{1\times1}$ |
| $f_{sf}(y_{m_s}, \Theta_c)$ | $y_{m_f} = y_{m_s} + \left[\frac{\Theta_c - \Theta_s}{L_s - L_c}\ \Theta_c\right]^T$ | $y_{m_s} = [\kappa_s\ \Theta_s]^T$ | $y_{m_f} \in R^{2\times1}, y_{m_s} \in R^{2\times1}$ |

Nomenclature for the variables in Table 1 is provided in Table 2.

| κ | Curvature | $()_s$ | Survey Package |
|---|---|---|---|
| Θ | Attitude | $()_s$ | Survey Package |
| SR | Steering Ratio | $()_c$ | Directional Module |
| TF | Toolface | $()_m$ | Measurement |
| L | Distance to Bit | | |

The wellbore trajectory model output consists of wellbore curvature and attitude: $y=[\kappa\ \Theta]^T$. The matrices A, B and C are functions of the drilling tool geometry, drill-bit's side cutting efficiency, weight on bit (WOB), hole overgauge, and tool response characteristics, among other parameters. A simplistic sensor fusion technique is selected that utilizes survey directional measurements and continuous directional measurement to determine the representative directional measurements.

The SLL and FLL are shown with a proportional logic in the aforementioned cases. In other examples, any combination of proportional, integral and derivative logic can be designed depending on the scenario. In one or more examples, the constant gains $k_f$, $k_s$ may take the form of vectors to allow more flexibility in adjusting the control term and bias term.

The control and biases terms provided by the SLL and FLL can be used in ways other than for calibrating the wellbore trajectory model. If run in real-time, the control terms and bias terms could be used to characterize the drilling tool's steering performance such as toolface offset. Toolface offset can be induced by the mechanical assembly of the drilling tool, delays in pad actuation, or phenomenon such as bit/bottom hole assembly (BHA) walk. With a toolface offset, command of a toolface of TF to the tool results in drilling in a direction TF+offset direction. If run as a post-job tool, the control term and bias term could be used to learn about the un-modeled steering tendencies in the drilled basin, which can be used to design the next job in the same area. For example, the unaccounted for (external, un-modeled, or un-predictable) effects on the wellbore trajectory can be identified which are valuable for geosteering and evaluating whether a given target can be successfully reached or for directional drilling to estimate the ability of a tool to follow a well plan. Unaccounted effects are the effects that are not modeled within the wellbore trajectory model that we are trying to calibrate. For instance, the wellbore trajectory model may not account for a change of formation during drilling that is not expected. As another example, the trajectory model may assume the rock to be isotropic as an oversimplification, so anisotropic rock is not accounted for by the wellbore trajectory model. BHA components such as pads pressed against the wellbore, drill bit and bearing may wear and impact the wellbore propagation. These influences may not be accounted for in the wellbore trajectory model. The control terms and/or bias terms account for these effects in the wellbore trajectory model. As another example, calibration parameter $\kappa_{Main}$, when compared to model parameter $\kappa_{Maa}$ indicates how different the drilling tool behaves from expected. If $\kappa_{Main}$ is large (in the same order with $\kappa_{Main}$) then that may point to a defect/failure that affects the steering performance of the drilling tool.

FIG. 7A to 7D show performance of the SLL and FLL learning loops for the system described in Table 1 in calibration of the wellbore trajectory model. The performance is characterized in terms of inclination error. The inclination error is an error (e.g., difference) between the inclination of the wellbore predicted by the wellbore trajectory model and the actual inclination of the wellbore which is drilled.

Figure 7A:
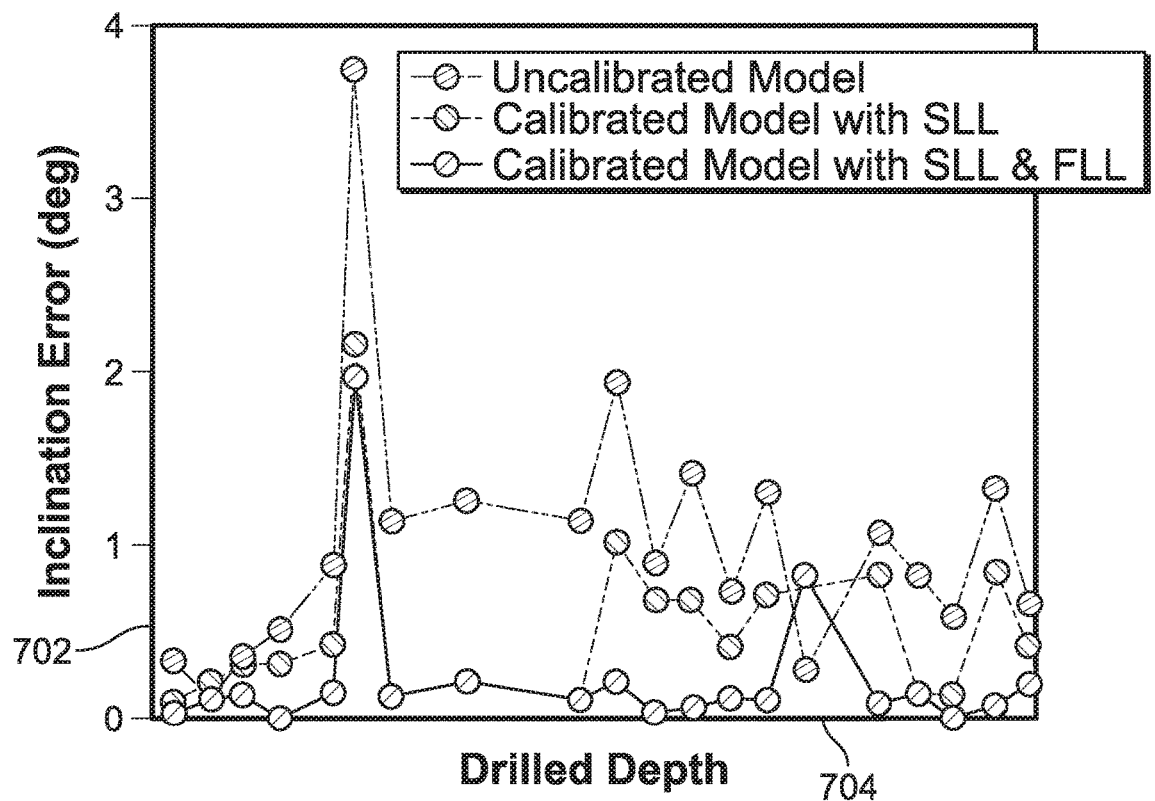
FIGS. 7A-D show performance of the wellbore trajectory model based on calibration by the fast and/or slow control inputs.
Figure 7B:
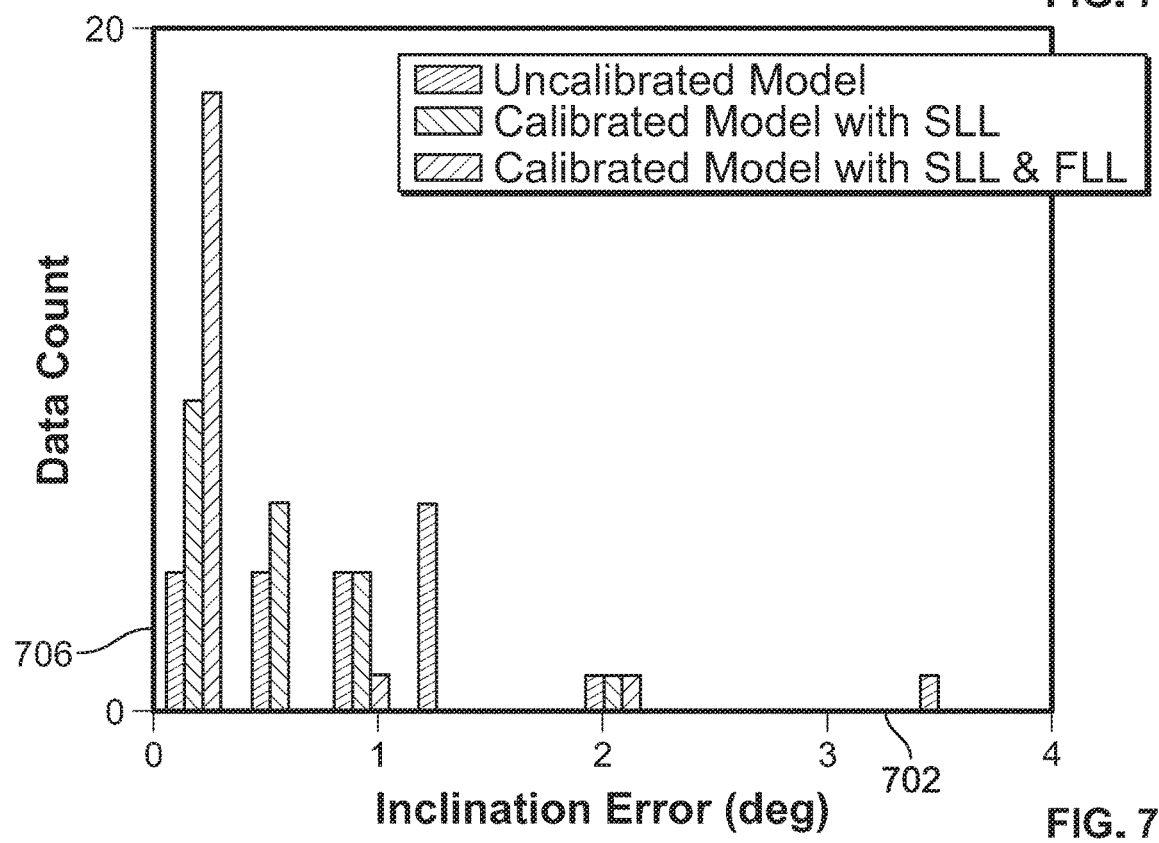

FIGS. 7A and 7B is a comparison of inclination error between an uncalibrated model and calibrated models with SLL and SLL & FLL for a curve section of the wellbore.

Figure 7C:
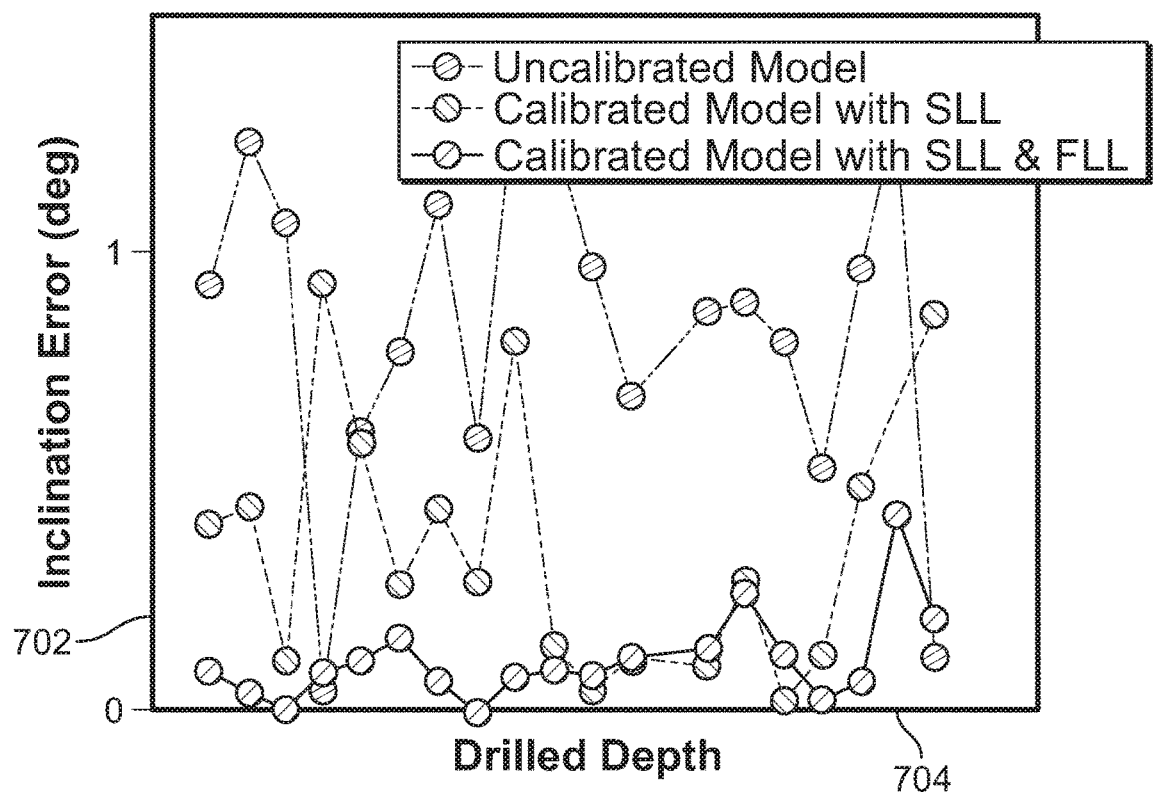
Figure 7D:
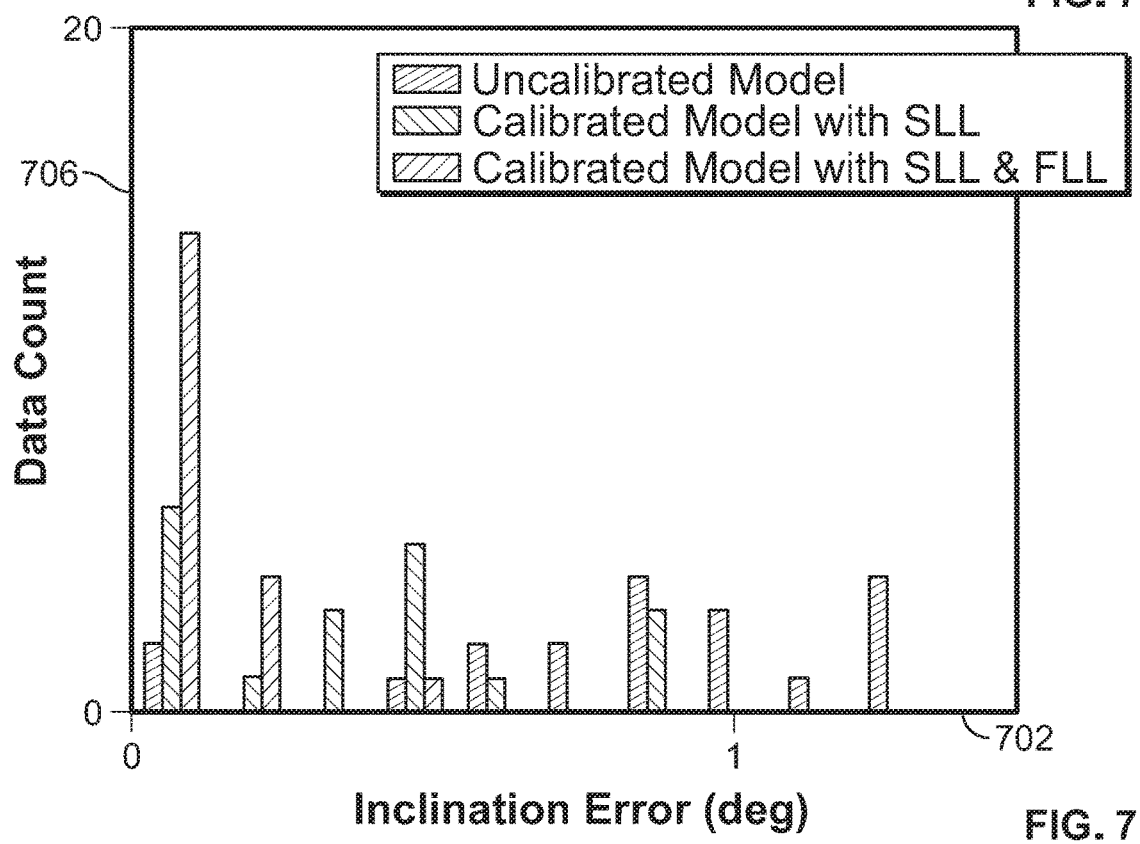

FIGS. 7C and 7D are a comparison of inclination error between an uncalibrated model and calibrated models with SLL and SLL & FLL for a tangent section of the wellbore.

The error comparison is illustrated in two different ways. The inclination error on axis 702 as a function of drilled depth (i.e., MD) on axis 704 is shown in FIG. 7A, 7C. The inclination error on axis 702 as a function of a count of a number of the inclination errors on axis 706 is shown in FIG. 7B, 7D.

Each circle indicates a survey position. At every survey position, the wellbore trajectory model is used to project the wellbore trajectory to a next survey position with three settings: (i) without calibration, (ii) with SLL calibration and (iii) with SLL and FLL calibration. The directional measurement associated with the projection at the next survey location includes an inclination angle. FLL frequency was set to 10 ft, so every 10 ft the wellbore trajectory is projected from the last survey to the position of the most recent continuous directional measurement to update the control input. In this regard, at each survey, inclination angle results for three settings are compared with actual inclination results indicated by survey directional measurements and resulting inclination errors (scaled per 100 ft due to varying survey intervals) are plotted.

FIG. 7A to 7D show the calibrated wellbore trajectory model with SLL and FLL significantly reduces the trajectory model projection error compared to the wellbore trajectory model calibrated with only SLL (calibrated model with SLL) or a model which is not calibrated (uncalibrated model) for both the curved sections (FIG. 7A, 7B) and tangent section (FIG. 7A, 7B) of the wellbore.

Figure 8:
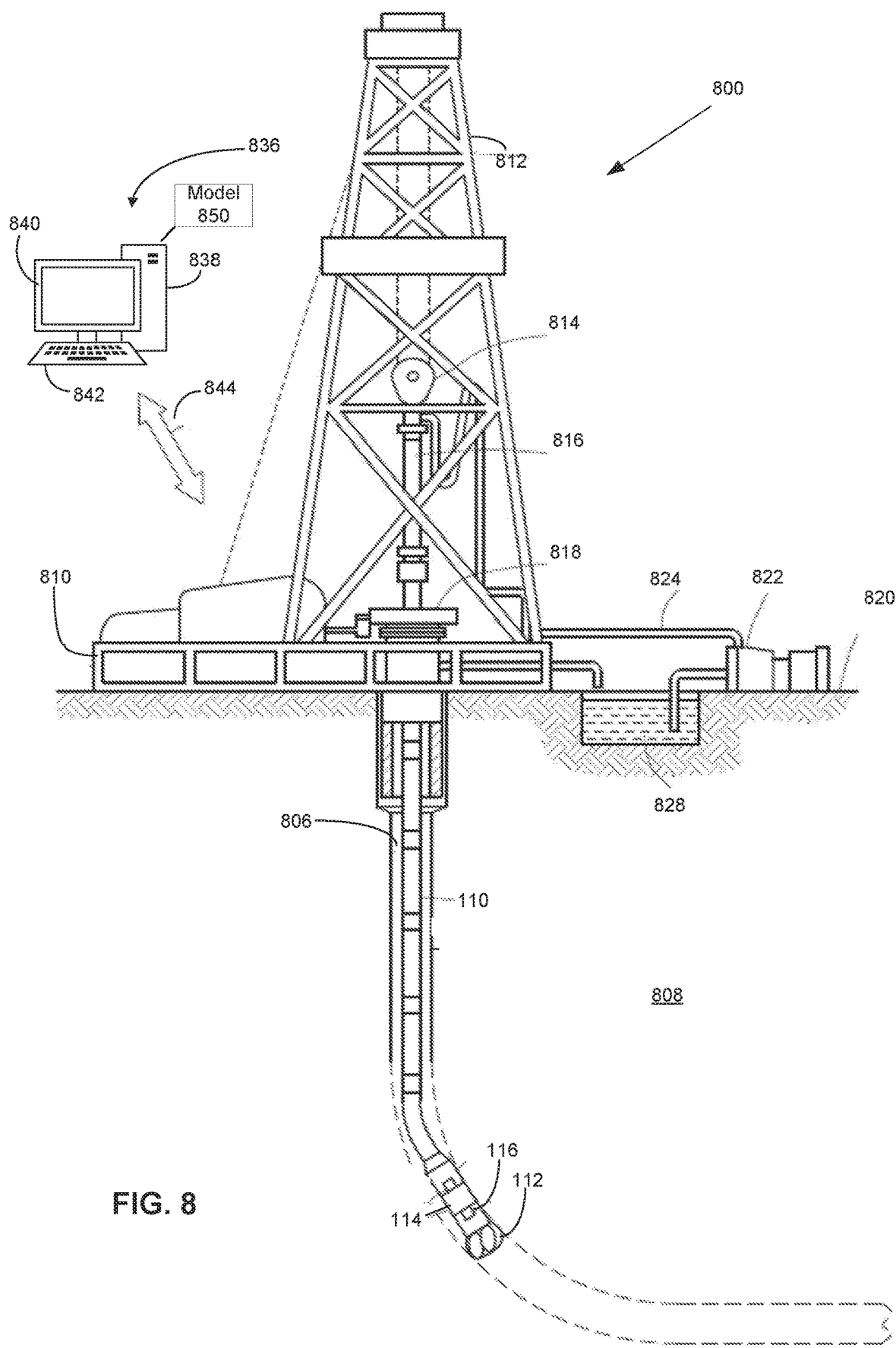
FIG. 8 is a schematic diagram of a well system associated with calibration of the wellbore trajectory model.

FIG. 8 is a schematic diagram of a well system 800 associated with calibration of a wellbore trajectory model in which the above the functions may be performed. The well system 800 includes a drill bit 112 disposed on a drill string 110 of the well system 800 for drilling a wellbore 806 in a subsurface formation 808. While wellbore 806 is shown extending generally vertically into the subsurface formation 808, the principles described herein are also applicable to wellbores that extend at an angle through the subsurface formation 808, such as horizontal and slanted wellbores. For example, the wellbore 806 can be angled vertically followed by a low inclination angle, high inclination angle or horizontal placement of the well. It should further be noted that a land-based operation is depicted, but those skilled in the art will readily recognize that the principles described herein are equally applicable to subsea operations that employ floating or sea-based platforms and rigs, without departing from the scope of the disclosure.

The well system 800 may further include a drilling platform 810 that supports a derrick 812 having a traveling block 814 for raising and lowering drill string 110. Drill string 110 may include, but is not limited to, drill pipe and coiled tubing, as generally known to those skilled in the art. A kelly 816 may support drill string 110 as it may be lowered through a rotary table 818. The drill bit 112 may crush or cut rock, be attached to the distal end of drill string 110 and be driven either be a downhole motor and/or via rotation of drill string 110 from the surface 820. Without limitation, drill bit 112 may include, roller cone bits, PDC bits, natural diamond bits, any hole openers, reamers, coring bits, and the like. As drill bit 112 rotates, it may create and extend wellbore 106 that penetrates various subterranean formations. A pump 822 may circulate drilling fluid through a feed pipe 824 to kelly 816, downhole through interior of drill string 110, through orifices in drill bit 112, back to surface 820 via an annulus surrounding drill string 110, and into a retention pit 828.

Drill bit 112 may be just one piece of the drill string 110 that may include a downhole device 114 such as a mud motor and/or a rotary steerable system (RSS) and one or a plurality of logging tools such as logging-while-drilling (LWD) or measuring-while-drilling (MWD) tools with sensors 116 for measuring, processing, and/or storing information such as the survey directional measurements and/or continuous directional measurements used to calibrate a wellbore trajectory model 850. The sensors 116 may be arranged to communicate with a computing system 836. Computing system 836 may include a processing unit 838, a monitor 840, an input device 842 (e.g., keyboard, mouse, etc.), computer media (e.g., optical disks, magnetic disks), and/or the wellbore trajectory model 850. While depicted as a computer, some examples can be any type of device or apparatus to perform operations described herein. The computing system 836 may store code representative of the self-learning controller and wellbore trajectory model described herein for calibration of the wellbore trajectory model which is then used to predict a wellbore trajectory based on steering inputs to a mud motor and/or rotary steerable system to directionally drill a wellbore in a geologic formation to reach a target. For example, if steering inputs result in a desired trajectory, then the drill bit is steered with the steering input. As another example, if steering inputs does not result in a desired trajectory, then the steering inputs are changed and the wellbore trajectory model is used to determine if the changed steering inputs result in the desired trajectory. In this regard, computing system 836 may act as a data acquisition system and possibly a data processing system that analyzes information from the sensors 116. Any suitable technique may be used for transmitting signals from the sensors 116 to the computing system 836. As illustrated, a communication link 844 (which may be wired or wireless, for example) may be provided to transmit data from the sensors 116 to the computing system 836. Communication link 844 may implement one or more of various known drilling telemetry techniques such as mud-pulse, acoustic, electromagnetic, etc. The computing system 836 may be located on the surface 820. In other examples, the computer system 836 may be located downhole and/or partially downhole and partially at the surface 820. In these cases, data from the sensors 116 may be processed downhole rather than being transmitted to the surface 820 and/or the computing system 836 may be communicatively coupled to one or more of the monitor 840 and/or input device located on the surface 820 via the communication link 844.

Figure 9:
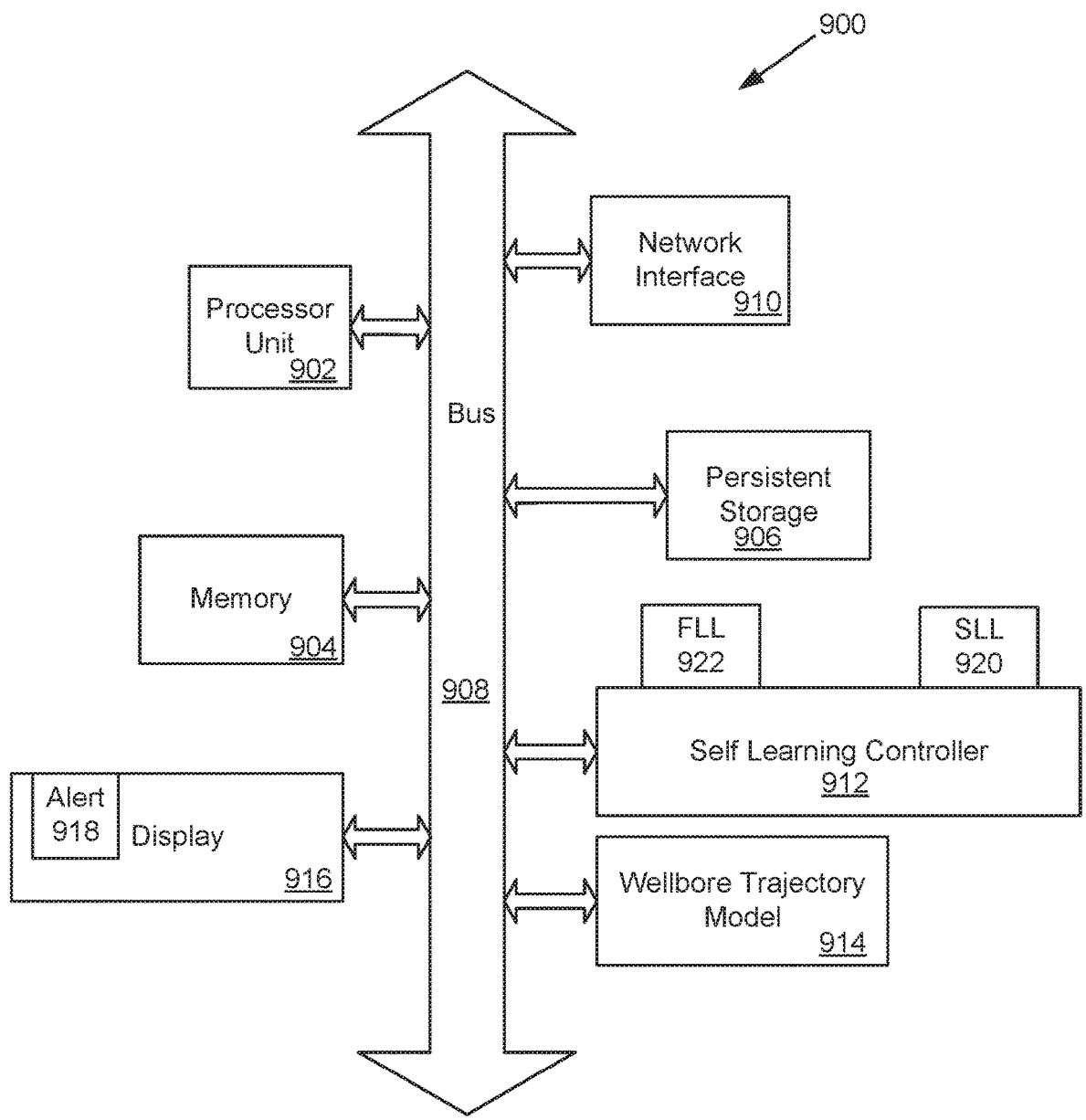
FIG. 9 is a block diagram of apparatus for calibrating the wellbore trajectory model.

FIG. 9 is a block diagram of apparatus 900 (e.g., wellbore trajectory system 104) for calibration of wellbore trajectory models. The apparatus 900 may be located at a surface of a formation, downhole or partially on the surface and partially downhole. In the case that the apparatus 900 is downhole, the apparatus 900 may be rugged, unobtrusive, can withstand the temperatures and pressures in situ in the wellbore.

The apparatus 900 includes a processor 902 (possibly including multiple processors, multiple cores, multiple nodes, and/or implementing multi-threading, etc.). The apparatus 900 includes memory 904. The memory 904 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium.

The apparatus 900 may also include a persistent data storage 906. The persistent data storage 906 can be a hard disk drive, such as magnetic storage device. The apparatus 900 also includes a bus 908 (e.g., PCI, ISA, PCI-Express, NuBus, etc.). Coupled to the bus 908 is a network interface 910 which facilitates communication with the logging tool. The network interface 910 may receive the continuous directional measurements and surveys directional measurements from the sensors which are stored in the persistent data storage 906. The apparatus 900 may have the self-learning controller 912 with FLL 922 and SLL 920 to perform calibration of wellbore trajectory model 914. The calibrated wellbore trajectory model 914 may be used to project a trajectory of a wellbore based on steering inputs to determine whether a set target may be reached. Based on the trajectory indicated by the wellbore trajectory model 914, the network interface 910 may send steering inputs to steer the drill bit to reach the target in the geologic formation.

Further, the apparatus 900 may comprise a display 916. The display 916 may comprise a computer screen or other visual device. The display 916 may indicate a trajectory of the wellbore. In the case that the apparatus 900 is located downhole, the display 916 may not be coupled to the bus 908, and instead the network interface 910 may be used to provide the feasibility information to the display located on the surface. Additionally, the display 916 may convey alerts 918. The wellbore trajectory model 914 may generate the alerts 918 relating whether a target is reachable. The alerts 918 may be visual in nature but they may also comprise audible alerts output by an audio output device (e.g., speaker).

The apparatus 900 may implement any one of the previously described functionalities partially (or entirely) in hardware and/or software (e.g., computer code, program instructions, program code, computer instructions) stored on a non-transitory machine readable medium/media. In some instances, the software is executed by the processor 902. Further, realizations can include fewer or additional components not illustrated in FIG. 9 (e.g., video cards, audio cards, additional network interfaces, peripheral devices, etc.). The processor 902 and the memory 904 are coupled to the bus 908. Although illustrated as being coupled to the bus 908, the memory 904 can be coupled to the processor 902.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative. In general, techniques for real time autonomous calibration of wellbore trajectory models for use in directional drilling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments include the following:

Embodiment 1: A method comprising: positioning one or more sensors downhole in a wellbore of a geological formation; performing, by the one or more sensors, at least one of one or more first directional measurements associated with the wellbore or one or more second directional measurements associated with the wellbore, wherein the one or more first directional measurements are performed less frequently than the one or more second directional measurements over a given measured depth along the wellbore; projecting, by a wellbore trajectory model, a trajectory of the wellbore to respective measured depths where at least one of the one or more first directional measurements or one or more second directional measurements was performed to predict one or more predicted directional measurements of the wellbore at the respective measured depths; determining one or more errors based on at least one of the one or more predicted directional measurements, the one or more first directional measurements, and the one or more second directional measurements; and calibrating the wellbore trajectory model based on the one or more errors.

Embodiment 2: The method of Embodiment 1, further comprising predicting a wellbore trajectory based on the calibrated wellbore trajectory model and steering inputs, and drilling the wellbore in the geological formation based on the predicted wellbore trajectory and steering inputs.

Embodiment 3: The method of Embodiment 1 or 2, wherein the one or more first directional measurements are one or more survey directional measurements; wherein the one or more second directional measurements are one or more continuous directional measurements; wherein a slow control input is based on a first error between a survey directional measurement and a first predicted directional measurement, wherein the first predicted directional measurement is based on at least one of the one or more survey directional measurements; wherein a fast control input is based on a second error between a continuous directional measurement and a second predicted directional measurement, wherein the second predicted directional measurement is based on at least one of the one or more survey directional measurements and at least one of the one or more continuous directional measurements; wherein the fast control input and the slow control input are input into the wellbore trajectory model to calibrate the wellbore trajectory model; wherein the fast control input is updated as additional continuous directional measurements are received and the slow control input is not updated until another survey directional measurement is received; and wherein the fast control input is updated more frequently than the slow control input.

Embodiment 4: The method of any of Embodiment 1-3, wherein determining the one or more errors comprises combining at least one of the one or more first directional measurements with at least one of the one or more second directional measurements to determine the fast control input.

Embodiment 5: The method of any of Embodiment 1-4, wherein the one or more first directional measurements are performed at a first and second measured depth along the wellbore while the one or more sensors are stationary and at least one of the one or more second directional measurements are performed at a third measured depth along the wellbore while the one or more sensors are moving; wherein predicting, by the wellbore trajectory model, the one or more predicted directional measurements comprises predicting, by the wellbore trajectory model, (i) a first predicted directional measurement at the second measured depth along the wellbore based on the first directional measurement at the first measured depth and (ii) a second predicted directional measurement at the third measured depth along the wellbore based on the first directional measurement at the second measured depth; wherein determining the one or more errors comprises determining a first error between the first predicted directional measurement and the first directional measurement at the second measured depth and a second error based on the second predicted directional measurement and the second directional measurement at the third measured depth; and wherein calibrating the wellbore trajectory model comprises calibrating the wellbore trajectory model based on the first and second error.

Embodiment 6: The method of any of Embodiment 1-5, wherein calibrating the wellbore trajectory model comprises determining a control input based on the first error and second error, determining a product of a control term and the control input, and adding a bias term to the product, wherein the control term and bias term are based on the first error and second error.

Embodiment 7: The method of any of Embodiment 1-6, further comprising fusing the first directional measurement at the second measured depth and the second directional measurement at the third measured depth to form a representative directional measurement; and wherein the second error is a difference between the predicted second directional measurement and the representative directional measurement.

Embodiment 8: The method of any of Embodiment 1-7, wherein the third measured depth is further downhole than the second measured depth and the second measured depth is further downhole than the first measured depth.

Embodiment 9: A system comprising: one or more sensors positioned downhole in a wellbore of a geologic formation; a wellbore trajectory model; a device to: perform, by the one or more sensors, at least one of one or more first directional measurements associated with the wellbore or one or more second directional measurements associated with the wellbore, wherein the one or more first directional measurements are performed less frequently than the one or more second directional measurements over a given measured depth along the wellbore; project, by the wellbore trajectory model, a trajectory of the wellbore to respective measured depths where at least one of the one or more first directional measurements or one or more second directional measurements was performed to predict one or more predicted directional measurements of the wellbore at the respective measured depths; determine one or more errors based on at least one of the one or more predicted directional measurements, the one or more first directional measurements, and the one or more second directional measurements; and calibrate the wellbore trajectory model based on the one or more errors.

Embodiment 10: The system of Embodiment 9, further comprising the device to predict a wellbore trajectory based on the calibrated wellbore trajectory model and steering inputs, and drilling the wellbore in the geological formation based on the predicted wellbore trajectory and steering inputs.

Embodiment 11: The system of Embodiment 9 or 10, wherein the one or more first directional measurements are one or more survey directional measurements; wherein the one or more second directional measurements are one or more continuous directional measurements; wherein a slow control input is based on a first error between a survey directional measurement and a first predicted directional measurement, wherein the first predicted directional measurement is based on at least one of the one or more survey directional measurements; wherein a fast control input is based on a second error between a continuous directional measurement and a second predicted directional measurement, wherein the second predicted directional measurement is based on at least one of the one or more survey directional measurements and at least one of the one or more continuous directional measurements; wherein the fast control input and the slow control input are input into the wellbore trajectory model to calibrate the wellbore trajectory model; wherein the fast control input is updated as additional continuous directional measurements are received and the slow control input is not updated until another survey directional measurement is received; and wherein the fast control input is updated more frequently than the slow control input.

Embodiment 12: The system of any of Embodiment 9-11, wherein the device to determine the one or more errors comprises the device to combine at least one of the one or more first directional measurements with at least one of the one or more second directional measurements to determine the fast control input.

Embodiment 13: The system of any of Embodiment 9-12, wherein the one or more first directional measurements are performed at a first and second measured depth along the wellbore while the one or more sensors are stationary and at least one of the one or more second directional measurements are performed at a third measured depth along the wellbore while the one or more sensors are moving; wherein the device to predict, by the wellbore trajectory model, the one or more predicted directional measurements comprises the device to predict (i) a first predicted directional measurement at the second measured depth along the wellbore based on the first directional measurement at the first measured depth and (ii) a second predicted directional measurement at the third measured depth along the wellbore based on the first directional measurement at the second measured depth; wherein the device to determine the one or more errors comprises the device to determine a first error between the first predicted directional measurement and the first directional measurement at the second measured depth and a second error based on the second predicted directional measurement and the second directional measurement at the third measured depth; and wherein the device to calibrate the wellbore trajectory model comprises the device to calibrate the wellbore trajectory model based on the first and second error.

Embodiment 14: The system of any of Embodiment 9-13, wherein the device to calibrate the wellbore trajectory model comprises the device to determine a control input based on the first error and second error, determine a product of a control term and the control input, and add a bias term to the product, wherein the control term and bias term are based on the first error and second error.

Embodiment 15: The system of any of Embodiment 9-14, further comprising the device to fuse the first directional measurement at the second measured depth and the second directional measurement at the third measured depth to form a representative directional measurement; and wherein the second error is a difference between the predicted second directional measurement and the representative directional measurement.

Embodiment 16: The system of any of Embodiment 9-15, wherein the third measured depth is further downhole than the second measured depth and the second measured depth is further downhole than the first measured depth.

Embodiment 17: One or more non-transitory machine-readable media comprising program code executable by a processor to: perform, by one or more sensors positioned downhole in a wellbore of a geological formation, at least one of one or more first directional measurements associated with the wellbore or one or more second directional measurements associated with the wellbore, wherein the one or more first directional measurements are performed less frequently than the one or more second directional measurements over a given measured depth along the wellbore; project, by a wellbore trajectory model, a trajectory of the wellbore to respective measured depths where at least one of the one or more first directional measurements or one or more second directional measurements was performed to predict one or more predicted directional measurements of the wellbore at the respective measured depths; determine one or more errors based on at least one of the one or more predicted directional measurements, the one or more first directional measurements, and the one or more second directional measurements; and calibrate the wellbore trajectory model based on the one or more errors.

Embodiment 18: The one or more non-transitory machine-readable media of Embodiment 17, further comprising program code executable by the processor to predict a wellbore trajectory based on the calibrated wellbore trajectory model and steering inputs, and drilling the wellbore in the geological formation based on the predicted wellbore trajectory and steering inputs.

Embodiment 19: The one or more non-transitory machine-readable media of any of Embodiment 17-18, wherein the program code to determine the one or more errors comprises program code to combine at least one of the one or more first directional measurements with at least one of the one or more second directional measurements to determine the fast control input.

Embodiment 20: The one or more non-transitory machine-readable media of any of Embodiment 17-19, wherein the one or more first directional measurements are performed at a first and second measured depth along the wellbore while the one or more sensors are stationary and at least one of the one or more second directional measurements are performed at a third measured depth along the wellbore while the one or more sensors are moving; wherein the program code to predict, by the wellbore trajectory model, the one or more predicted directional measurements comprise program code to predict (i) a first predicted directional measurement at the second measured depth along the wellbore based on the first directional measurement at the first measured depth and (ii) a second predicted directional measurement at the third measured depth along the wellbore based on the first directional measurement at the second measured depth; wherein the program code to determine the one or more errors comprises program code to determine a first error between the first predicted directional measurement and the first directional measurement at the second measured depth and a second error based on the second predicted directional measurement and the second directional measurement at the third measured depth; and wherein the program code to calibrate the wellbore trajectory model comprises program code to calibrate the wellbore trajectory model based on the first and second error.

What is claimed is:
1. A method comprising:
drilling, with a drilling tool coupled with a drill string, a wellbore through a geological formation, wherein one or more sensors are coupled with the drill string and positioned downhole in the wellbore of the geological formation;

obtaining, with the one or more sensors, one or more steering inputs;

obtaining, with the one or more sensors, a first directional measurement of the wellbore, wherein the first directional measurement is a stationary directional measurement that is obtained while the drilling tool is stopped, and wherein the first directional measurement is obtained for a first distance along the wellbore;

obtaining, with the one or more sensors, a second directional measurement of the wellbore, wherein the second directional measurement is a continuous directional measurement comprising a continuous attitude measurement that is obtained while the drilling tool is moving, and wherein the second directional measurement is obtained for a second distance along the wellbore;

obtaining, with the one or more sensors, a third directional measurement of the wellbore, wherein the third directional measurement is at least one of a second stationary directional measurement and a second continuous directional measurement;

modifying, with a sensor fusion logic, the second directional measurement with the continuous attitude measurement and the first directional measurement to generate a representative directional measurement at the second distance associated with the second directional measurement, wherein the sensor fusion logic is configured to weigh the first directional measurement relative to the continuous attitude measurement based on a differential distance between the first distance and the second distance;

projecting, with a wellbore trajectory model, a trajectory of the wellbore along a distance associated with the third directional measurement based, at least in part, on the representative directional measurement;

determining, with the wellbore trajectory model, a predicted directional measurement based, at least in part, on the projected trajectory;

determining, with a self-learning controller, a first error based, at least in part, on a difference between the predicted directional measurement and the representative directional measurement;

determining a first control input based on the first error and the one or more steering inputs;

determining, with the self-learning controller, a second error based, at least in part, on the difference between the predicted directional measurement and the first directional measurement;

determining a second control input based on the second error and the one or more steering inputs;

calibrating, with the self-learning controller, the wellbore trajectory model based on the first control input and the second control input; and predicting a wellbore trajectory based on the calibrated wellbore trajectory model and the one or more steering inputs, and steering the drilling tool through the geological formation based, at least in part, on the wellbore trajectory.

2. The method of claim 1, further comprising determining a first steering input based, at least in part, on the calibrated wellbore trajectory model.

3. The method of claim 1, further comprising:

obtaining a fourth directional measurement associated with the wellbore, wherein the fourth directional measurement is a continuous directional measurement;

projecting, with the wellbore trajectory model, a trajectory of the wellbore along a distance associated with the fourth directional measurement based, at least in part, on at least one of the first directional measurement and the second directional measurement;

determining a predicted fourth directional measurement based, at least in part, on the projected trajectory;

determining the second error based, at least in part, on a difference between the fourth predicted directional measurement and the fourth directional measurement;

wherein the third directional measurement is a stationary directional measurement;

wherein a slow control input is based on the first error;

wherein a fast control input is based on the second error; and wherein calibrating the wellbore trajectory model based on the first error comprises calibrating the wellbore trajectory model based, at least in part, on the fast control input and the slow control input.

4. The method of claim 1, wherein the first directional measurement is obtained for the first distance and a fourth distance along the wellbore;

wherein projecting, with the wellbore trajectory model, the trajectory of the wellbore along the distance associated with the third directional measurement comprises projecting, with the wellbore trajectory model, a slow trajectory of the wellbore based, at least in part, on the first directional measurement at the first distance along the wellbore and the first directional measurement at the fourth distance along the wellbore, and a fast trajectory of the wellbore based, at least in part, on the second directional measurement at the second distance along the wellbore and at least one of the first directional measurement at the first distance along the wellbore and the first directional measurement at the fourth distance along the wellbore;

wherein determining a predicted third directional measurement comprises determining a slow predicted third directional measurement based, at least in part, on the slow trajectory of the wellbore and determining a fast predicted third directional measurement based, at least in part, on the fast trajectory of the wellbore;

wherein determining the first error comprises determining the first error based, at least in part, on a difference between the slow predicted third directional measurement and the third directional measurement and determining the second error based, at least in part, on a difference between the fast predicted third directional measurement and the third directional measurement; and wherein calibrating the wellbore trajectory model comprises calibrating the wellbore trajectory model based on the first error and the second error.

5. The method of claim 4, wherein the second distance is further downhole than the fourth distance and the fourth distance is further downhole than the first distance.

6. A system comprising:

a wellbore trajectory model;

a processor; and instructions executable by the processor to:

drill, with a drilling tool coupled with a drill string, a wellbore through a geological formation, wherein one or more sensors are coupled with the drill string and positioned downhole in the wellbore of the geological formation;

obtain, with the one or more sensors, one or more steering inputs;

obtain, with the one or more sensors, a first directional measurement of the wellbore, wherein the first directional measurement is a stationary directional measurement that is obtained while the drilling tool is stopped, and wherein the first directional measurement is obtained for a first distance along the wellbore;

obtain, with the one or more sensors, a second directional measurement of the wellbore, wherein the second directional measurement is a continuous directional measurement comprising a continuous attitude measurement that is obtained while the drilling tool is moving, and wherein and wherein the second directional measurement is obtained for a second distance along the wellbore;

obtain, with the one or more sensors, a third directional measurement of the wellbore, wherein the third directional measurements is at least one of a second stationary directional measurement and a second continuous directional measurement;

modify, with a sensor fusion logic, the second directional measurement with the continuous attitude measurement and the first directional measurement to generate a representative directional measurement at the second distance associated with the second directional measurement, wherein the sensor fusion logic is configured to weigh the first directional measurement relative to the continuous attitude measurement based on a differential distance between the first distance and the second distance;

project, with the wellbore trajectory model, a trajectory of the wellbore along a distance associated with the third directional measurement based, at least in part, on the representative directional measurement;

determine, with the wellbore trajectory model, a predicted third directional measurement based, at least in part, on the projected trajectory;

determine, with a self-learning controller, a first error based, at least in part, on a difference between the predicted third directional measurement and the representative directional measurement;

determine a first control input based on the first error and the one or more steering inputs;

determine, with the self-learning controller, a second error based, at least in part, on the difference between the predicted third directional measurement and the first directional measurement;

determine a second control input based on the second error and the one or more steering inputs;

calibrate the wellbore trajectory model based on the first control input and the second control input; and predict a wellbore trajectory based on the calibrated wellbore trajectory model and the one or more steering inputs, and steer the drilling tool through the geological formation based, at least in part, on the wellbore trajectory.

7. The system of claim 6, wherein the first directional measurement comprises a survey directional measurement.

8. The system of claim 6,
wherein the first directional measurement is obtained for the first distance and fourth distance along the wellbore;
wherein the instructions to project, with the wellbore trajectory model, a trajectory of the wellbore along the distance associated with the third directional measurement comprise instructions to project, with the wellbore trajectory model, a slow trajectory of the wellbore based, at least in part, on the first directional measurement at the first distance along the wellbore and the first directional measurement at the fourth distance along the wellbore; and a fast trajectory of the wellbore based, at least in part, on the second directional measurement at the second distance along the wellbore and at least one of the first directional measurement at the first distance along the wellbore and the first directional measurement at the fourth distance along the wellbore;

wherein instructions to determine the predicted third directional measurement comprise instructions to determine a slow predicted third directional measurement based, at least in part, on the slow trajectory and to determine a fast predicted third directional measurement based, at least in part, on the fast trajectory;

wherein the instructions to determine the first error comprise instructions to determine the first error based, at least in part, on a difference between the slow predicted third directional measurement and the third directional measurement and instructions to determine the second error based, at least in part, on a difference between the fast predicted third directional measurement and the third directional measurement; and wherein the instructions to calibrate the wellbore trajectory model comprise instructions to calibrate the wellbore trajectory model based on the first error and the second error.

9. The system of claim 8, wherein the instructions to calibrate the wellbore trajectory model comprises instructions to:
determine a control input based on at least one of the first error and the second error,
wherein instructions to calibrate the wellbore trajectory model comprise instructions to calibrate the wellbore trajectory model based, at least in part, on the control input.

10. One or more non-transitory machine-readable media comprising program code executable by a processor to:
drill, with a drilling tool coupled with a drill string, a wellbore through a geological formation, wherein one or more sensors positioned downhole in the wellbore of the geological formation;

obtain, with one or more sensors, one or more steering inputs;

obtain, with the one or more sensors, a first directional measurement of the wellbore, wherein the first directional measurement is a stationary directional measurement that is obtained while the drilling tool is stopped, and wherein the first directional measurement is obtained for a first distance along the wellbore;

obtain, with the one or more sensors, a second directional measurement of the wellbore, wherein the second directional measurement is a continuous directional measurement comprising a continuous attitude measurement that is obtained while the drilling tool is moving, and wherein the second directional measurement is obtained for a second distance along the wellbore;

obtain, with the one or more sensors, a third directional measurement of the wellbore, wherein the third directional measurement is at least one of a second stationary directional measurement and a second continuous directional measurement;

modify, with a sensor fusion logic, the second directional measurement with the continuous attitude measurement and the first directional measurement to generate a representative directional measurement at the second distance associated with the second directional measurement, wherein the sensor fusion logic is configured to weigh the first directional measurement relative to the continuous attitude measurement based on a differential distance between the first distance and the second distance;

project, with a wellbore trajectory model, a trajectory of the wellbore along a distance associated with the third directional measurement based, at least in part, on at least one of the first directional measurement and the second directional measurement;

determine, with the wellbore trajectory model, a predicted third directional measurement based, at least in part, on the projected trajectory;

determine, with a self-learning controller, a first error based, at least in part, on a difference between the predicted third directional measurement and the representative directional measurement;

determine a first control input based on the first error and the one or more steering inputs;

determine, with the self-learning controller, a second error based, at least in part, on the difference between the predicted third directional measurement and the first directional measurement;

determine a second control input based on the second error and the one or more steering inputs;

calibrate the wellbore trajectory model based on the first control input and the second control input; and predict a wellbore trajectory based on the calibrated wellbore trajectory model and the one or more steering inputs, and steer the drilling tool through the geological formation based, at least in part, on the wellbore trajectory.

11. The one or more non-transitory machine-readable media of claim 10, wherein the first directional measurement is obtained for the first distance and a fourth distance along the wellbore;

wherein the program code executable by the processor to project, with the wellbore trajectory model, a trajectory of the wellbore a distance along the wellbore associated with the third directional measurement comprises program code executable by the processor to project, with the wellbore trajectory model, a slow trajectory of the wellbore based, at least in part, on the first directional measurement at the first distance along the wellbore and the first directional measurement at the fourth distance along the wellbore; and a fast trajectory of the wellbore based, at least in part, on the second directional measurement at the second distance along the wellbore and at least one of the first directional measurement at the first distance along the wellbore and the first directional measurement at the fourth distance along the wellbore;

wherein the program code executable by the processor to determine the predicted third directional measurement comprises program code executable by the processor to determine a slow predicted third directional measurement based, at least in part, on the slow trajectory and to determine a fast predicted third directional measurement based, at least in part, on the fast trajectory;

wherein the program code executable by the processor to determine the first error comprises program code executable by the processor to determine the first error based, at least in part, on a difference between the slow predicted third directional measurement and the third directional measurement and program code executable by the processor to determine the second error based, at least in part, on a difference between the fast predicted third directional measurement and the third directional measurement; and wherein the program code executable by the processor to calibrate the wellbore trajectory model comprises program code executable by the processor to calibrate the wellbore trajectory model based on the first error and the second error.

12. The system of claim 6, further comprising instructions to:

obtain a fourth directional measurement associated with the wellbore, wherein the fourth directional measurement is a continuous directional measurement and wherein the third directional measurement is a stationary directional measurement;

project, with the wellbore trajectory model, a trajectory of the wellbore along a distance associated with the fourth directional measurement, based, at least in part, on at least one of the first directional measurement and the second directional measurement;

determine a predicted fourth directional measurement based, at least in part, on the projected trajectory;

determine the second error based, at least in part, on a difference between the fourth predicted directional measurement and the fourth directional measurement; and wherein instructions to calibrate the wellbore trajectory model based on the first error comprise instruction to calibrate the wellbore trajectory model based, at least in part, on the first error and the second error.

13. The one or more non-transitory machine-readable media of claim 11, wherein program code executable by the processor to calibrate the wellbore trajectory model comprises program code executable by the processor to:

determine a control input based, at least in part, on the at least one of the first error and the second error; and adjust at least one of the wellbore trajectory model and the trajectory of the wellbore based, at least in part, on the control input.

14. The one or more non-transitory machine-readable media of claim 13, wherein program code executable by the processor to adjust at least one of the wellbore trajectory model and the trajectory of the wellbore comprises program code executable to adjust at least one of the wellbore trajectory model and the trajectory of the wellbore based on a control loop and wherein the control input comprises at least one of a proportional control input, a integral control input, and a derivative control input.

15. The system of claim 6, wherein the one or more steering inputs comprise toolface and steering ratio.

16. The one or more non-transitory machine-readable media of claim 10, wherein the one or more steering inputs comprise toolface and steering ratio.

17. The method of claim 1, wherein the first directional measurement and the second directional measurement comprise curvature, attitude, and spatial position of the wellbore.

18. The method of claim 1, wherein a weight of the first directional measurement is less than the weight of the second directional measurement as the differential distance between the first distance and the second distance increases.

19. The method of claim 1, wherein the first directional measurement is modified with a ratio of attitude measurements and distances to the drilling tool.

20. The method of claim 1, wherein the first error comprises a first vector of errors from a plurality of measured depths along the wellbore, and wherein the steering inputs comprise a second vector or the steering inputs from the plurality of measured depths along the wellbore.

* * * * *